(12) United States Patent
Krauss et al.

(10) Patent No.: US 11,317,145 B2
(45) Date of Patent: Apr. 26, 2022

(54) METHOD, APPARATUS, COMPUTER PROGRAM AND SYSTEM FOR DETERMINING INFORMATION RELATED TO THE AUDIENCE OF AN AUDIO-VISUAL CONTENT PROGRAM

(71) Applicants: FRAUNHOFER-GESELLSCHAFT ZUR FÖRDERUNG DER ANGEWANDTEN FORSCHUNG E.V., Munich (DE); TV-Insight GmbH, Elsbethen-Glasenbach (AT)

(72) Inventors: Christopher Krauss, Berlin (DE); Robert Seeliger, Berlin (DE); Stefan Arbanowski, Berlin (DE); Andrea Duerager, Berlin (DE); Lukas Reisser, Salzburg (AT); Sebastian Hinterstoisser, Piding (DE)

(73) Assignees: Fraunhofer-Gesellschaft zur Förderung der angewandten Forschung e. V., Munich (DE); TV-Insight GmbH, Elsbethen-Glasenbach (AT)

( * ) Notice: Subject to any disclaimer, the term of this patent is extended or adjusted under 35 U.S.C. 154(b) by 0 days.

(21) Appl. No.: 16/625,187

(22) PCT Filed: Jun. 22, 2018

(86) PCT No.: PCT/EP2018/066769
§ 371 (c)(1),
(2) Date: Dec. 20, 2019

(87) PCT Pub. No.: WO2018/234548
PCT Pub. Date: Dec. 27, 2018

(65) Prior Publication Data
US 2020/0145720 A1   May 7, 2020

(30) Foreign Application Priority Data

Jun. 23, 2017 (EP) .................................... 17177750
Sep. 29, 2017 (EP) .................................... 17193940

(51) Int. Cl.
| | | |
|---|---|---|
| H04N 21/466 | (2011.01) |
| H04N 21/442 | (2011.01) |
| H04N 21/44 | (2011.01) |
| H04N 21/488 | (2011.01) |
| H04N 21/81 | (2011.01) |

(52) U.S. Cl.
CPC . *H04N 21/44213* (2013.01); *H04N 21/44016* (2013.01); *H04N 21/4667* (2013.01); *H04N 21/4886* (2013.01); *H04N 21/812* (2013.01)

(58) Field of Classification Search
None
See application file for complete search history.

(56) References Cited

U.S. PATENT DOCUMENTS 9,936,249 B1 *   4/2018   Nelson ............. H04N 21/25883
2008/0250447 A1   10/2008   Rowe et al.
(Continued)

FOREIGN PATENT DOCUMENTS

JP   2002271823 A   9/2002
JP   2003 284008 A   10/2003
(Continued)

*Primary Examiner* — William J Kim
(74) *Attorney, Agent, or Firm* — 2SPL Patentanwälte PartG mbB; Kieran O'Leary

(57) ABSTRACT

Examples relate to a method, a computer program, an apparatus and a system for determining information related to an audience of an audio-visual content program. The method comprises monitoring at least a subset of the audience. The method further comprises determining the information related to the audience based on the monitored subset of the audience. The information related to the audience comprises measured metrics for the subset of the audience. The method further comprises determining at least one conversion factor based on a relationship between a property value measured within at least one previously monitored audience subsets and the corresponding property value of the previous audience. The at least one conversion factor (Continued)

indicates a relationship between a property measured within the monitored subset of the audience and at least one property of the audience. The method further comprises estimating the at least one property of the audience based on the at least one conversion factor.

20 Claims, 27 Drawing Sheets

(56) References Cited

U.S. PATENT DOCUMENTS

| | | |
|---|---|---|
| 2011/0016482 A1 | 1/2011 | Tidwell et al. |
| 2011/0145849 A1* | 6/2011 | Ng .................... H04N 21/6582 725/14 |
| 2013/0262181 A1* | 10/2013 | Topchy .............. G06Q 30/0202 705/7.31 |
| 2013/0346154 A1* | 12/2013 | Holz .................... H04N 21/812 705/7.31 |
| 2015/0319490 A1* | 11/2015 | Besehanic ........ H04N 21/44222 725/19 |
| 2016/0134934 A1 | 5/2016 | Jared et al. |
| 2017/0004526 A1 | 1/2017 | Morovati et al. |
| 2017/0064351 A1 | 3/2017 | Jakkula et al. |

FOREIGN PATENT DOCUMENTS

| | | |
|---|---|---|
| JP | 2005184228 A | 7/2005 |
| JP | 2010-130585 A | 6/2010 |
| JP | 2010 524349 A | 7/2010 |
| JP | 2012 522470 A | 9/2012 |

* cited by examiner

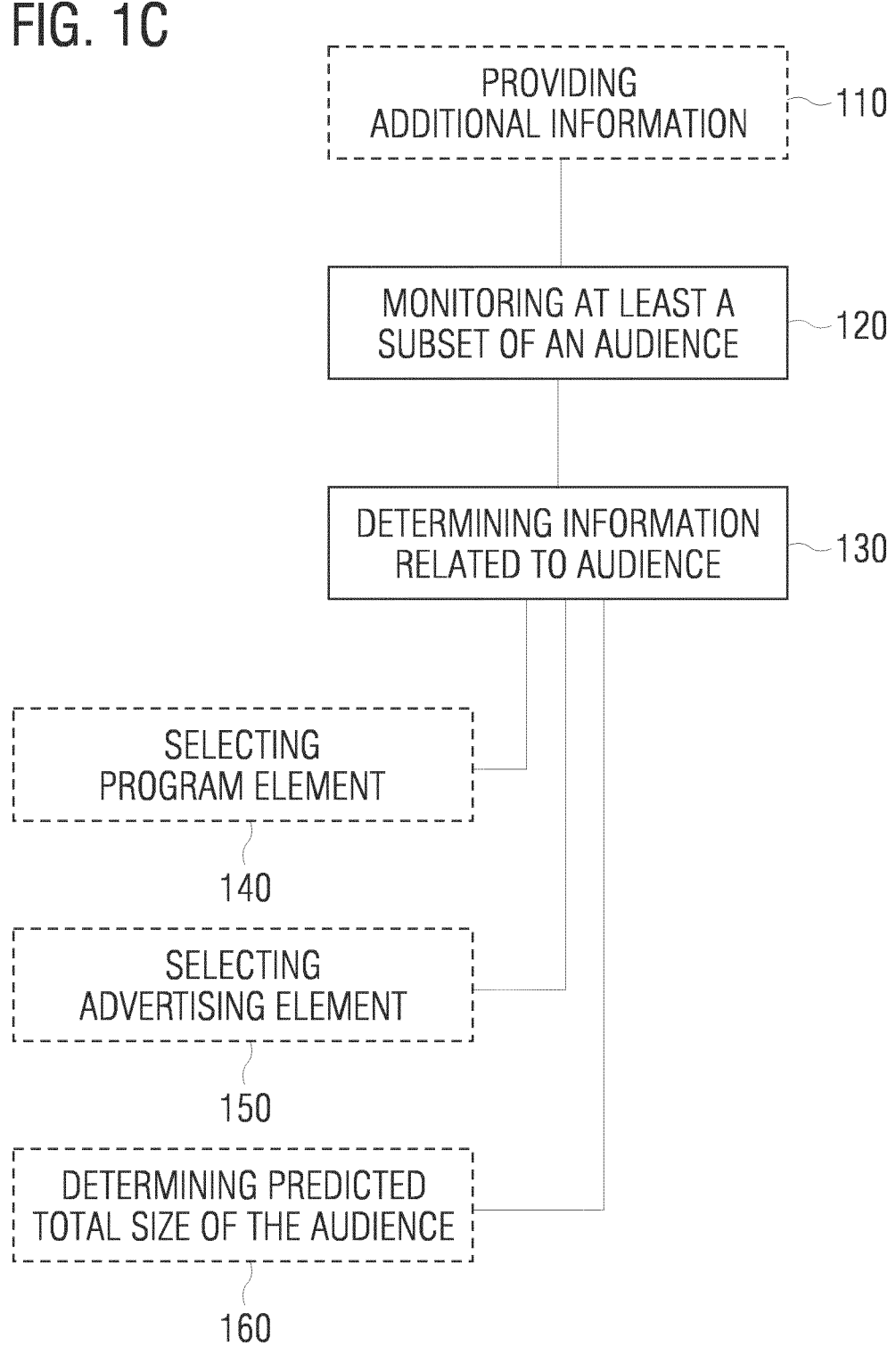

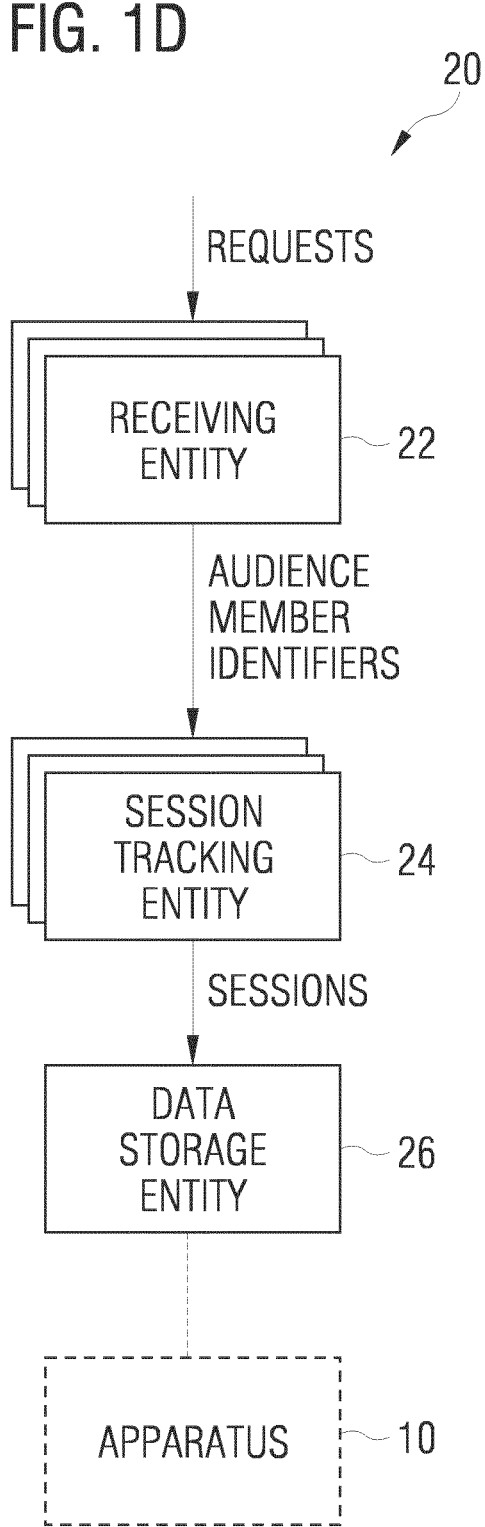

FIG. 2A-1

| | FIG. 2A | | |
|---|---|---|---|
| | FIG. 2A-1 | FIG. 2A-3 | FIG. 2A-5 |
| | FIG. 2A-2 | FIG. 2A-4 | FIG. 2A-6 |

| 202 | 204 | 206 | 208 | 210 | 212 |
|---|---|---|---|---|---|
| Zeit | Panel-NR | Panel-Abs | HbbTV-Abs | ConFact-HbbTV | F-Week |
| 29.1.17 17:53 | 64585 | 27 | 2541 | 25,41717178 | 5 |
| 29.1.17 17:54 | 55361 | 24 | 2624 | 21,09798548 | 5 |
| 29.1.17 17:55 | 67148 | 28 | 2656 | 25,28173347 | 5 |
| 29.1.17 17:56 | 69773 | 29 | 2775 | 25,14348825 | 5 |
| 29.1.17 17:57 | 70649 | 30 | 2850 | 24,78920919 | 5 |
| 29.1.17 17:58 | 70985 | 31 | 2777 | 25,56165142 | 5 |
| 29.1.17 17:59 | 63783 | 28 | 2714 | 23,50142108 | 5 |
| 29.1.17 18:00 | 62063 | 28 | 2767 | 22,42982093 | 5 |
| 29.1.17 18:01 | 58381 | 26 | 2697 | 21,64660237 | 5 |
| 29.1.17 18:02 | 58759 | 26 | 2660 | 22,08993056 | 5 |
| 29.1.17 18:03 | 65897 | 29 | 2816 | 23,40108636 | 5 |
| 29.1.17 18:04 | 69066 | 30 | 2915 | 23,69336247 | 5 |
| 29.1.17 18:05 | 62162 | 28 | 2781 | 22,35238202 | 5 |
| 29.1.17 18:06 | 67406 | 31 | 2781 | 24,23811273 | 5 |
| 29.1.17 18:07 | 64910 | 29 | 2879 | 22,54599548 | 5 |
| 29.1.17 18:08 | 75279 | 33 | 2905 | 25,91343363 | 5 |
| 29.1.17 18:09 | 81032 | 34 | 2920 | 27,75064606 | 5 |
| 29.1.17 18:10 | 68247 | 30 | 2858 | 23,87945315 | 5 |
| 29.1.17 18:11 | 72453 | 32 | 2842 | 25,49378054 | 5 |
| 29.1.17 18:12 | 68146 | 30 | 2807 | 24,27710474 | 5 |
| 29.1.17 18:13 | 71554 | 31 | 2865 | 24,97536279 | 5 |
| 29.1.17 18:14 | 73674 | 31 | 2867 | 25,69723122 | 5 |
| 29.1.17 18:15 | 66791 | 29 | 2830 | 23,60116247 | 5 |
| 29.1.17 18:16 | 60957 | 27 | 2764 | 22,05402486 | 5 |
| 29.1.17 18:17 | 59519 | 26 | 2779 | 21,41750054 | 5 |
| 29.1.17 18:18 | 66992 | 30 | 2872 | 23,32601288 | 5 |
| 29.1.17 18:19 | 64817 | 28 | 2850 | 22,74293239 | 5 |
| 29.1.17 18:20 | 61926 | 27 | 2744 | 22,56770922 | 5 |
| 29.1.17 18:21 | 57845 | 25 | 2723 | 21,24328039 | 5 |
| 29.1.17 18:22 | 59498 | 26 | 2768 | 21,49499686 | 5 |
| 29.1.17 18:23 | 59498 | 26 | 2754 | 21,60426699 | 5 |
| 29.1.17 18:24 | 69215 | 30 | 2782 | 24,87950068 | 5 |
| 29.1.17 18:25 | 62804 | 27 | 2780 | 22,59131302 | 5 |
| 29.1.17 18:26 | 69452 | 28 | 2756 | 25,20033469 | 5 |
| 29.1.17 18:27 | 64114 | 27 | 2708 | 23,67559952 | 5 |
| 29.1.17 18:28 | 65378 | 28 | 2678 | 24,41307009 | 5 |
| 29.1.17 18:29 | 66656 | 28 | 2676 | 24,90865564 | 5 |
| 29.1.17 18:30 | 61722 | 26 | 2695 | 22,90232579 | 5 |
| 29.1.17 18:31 | 72282 | 31 | 2699 | 26,78098529 | 5 |

FIG. 2A-2

| F-DayOfWeek | F-TimeOfDay | F-Holiday | F-NextDayFree | F-ProgrammType |
|---|---|---|---|---|
| 1 | 894 | 0 | 0 | 0 |
| 1 | 895 | 0 | 0 | 0 |
| 1 | 896 | 0 | 0 | 0 |
| 1 | 897 | 0 | 0 | 0 |
| 1 | 898 | 0 | 0 | 0 |
| 1 | 899 | 0 | 0 | 0 |
| 1 | 900 | 0 | 0 | 0 |
| 1 | 901 | 0 | 0 | 0 |
| 1 | 902 | 0 | 0 | 0 |
| 1 | 903 | 0 | 0 | 0 |
| 1 | 904 | 0 | 0 | 0 |
| 1 | 905 | 0 | 0 | 0 |
| 1 | 906 | 0 | 0 | 0 |
| 1 | 907 | 0 | 0 | 0 |
| 1 | 908 | 0 | 0 | 0 |
| 1 | 909 | 0 | 0 | 0 |
| 1 | 910 | 0 | 0 | 0 |
| 1 | 911 | 0 | 0 | 0 |
| 1 | 912 | 0 | 0 | 0 |
| 1 | 913 | 0 | 0 | 0 |
| 1 | 914 | 0 | 0 | 0 |
| 1 | 915 | 0 | 0 | 0 |
| 1 | 916 | 0 | 0 | 0 |
| 1 | 917 | 0 | 0 | 0 |
| 1 | 918 | 0 | 0 | 0 |
| 1 | 919 | 0 | 0 | 0 |
| 1 | 920 | 0 | 0 | 0 |
| 1 | 921 | 0 | 0 | 0 |
| 1 | 922 | 0 | 0 | 0 |
| 1 | 923 | 0 | 0 | 0 |
| 1 | 924 | 0 | 0 | 0 |
| 1 | 925 | 0 | 0 | 0 |
| 1 | 926 | 0 | 0 | 0 |
| 1 | 927 | 0 | 0 | 0 |
| 1 | 928 | 0 | 0 | 0 |
| 1 | 929 | 0 | 0 | 0 |
| 1 | 930 | 0 | 0 | 0 |
| 1 | 931 | 0 | 0 | 0 |
| 1 | 932 | 0 | 0 | 0 |

FIG. 2A-3

| F-ProgrammStart (224) | F-ProgrammEnd (226) | F-ProgrammDuration (228) |
|---:|---:|---:|
| 893 | 905 | 720 |
| 893 | 905 | 720 |
| 893 | 905 | 720 |
| 893 | 905 | 720 |
| 893 | 905 | 720 |
| 893 | 905 | 720 |
| 893 | 905 | 720 |
| 893 | 905 | 720 |
| 893 | 905 | 720 |
| 893 | 905 | 720 |
| 893 | 905 | 720 |
| 905 | 920 | 900 |
| 905 | 920 | 900 |
| 905 | 920 | 900 |
| 905 | 920 | 900 |
| 905 | 920 | 900 |
| 905 | 920 | 900 |
| 905 | 920 | 900 |
| 905 | 920 | 900 |
| 905 | 920 | 900 |
| 905 | 920 | 900 |
| 905 | 920 | 900 |
| 905 | 920 | 900 |
| 905 | 920 | 900 |
| 905 | 920 | 900 |
| 905 | 920 | 900 |
| 920 | 933 | 780 |
| 920 | 933 | 780 |
| 920 | 933 | 780 |
| 920 | 933 | 780 |
| 920 | 933 | 780 |
| 920 | 933 | 780 |
| 920 | 933 | 780 |
| 920 | 933 | 780 |
| 920 | 933 | 780 |
| 920 | 933 | 780 |
| 920 | 933 | 780 |
| 920 | 933 | 780 |
| 920 | 933 | 780 |

FIG. 2A-4

| F-ProgrammTitle (230) | F-ProgrammSubtitle (232) | F-ProgrammTarif (234) |
|---|---|---|
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |
| "Servus Hockey Night Live" | "KAC vs. Red Bull Salzburg" | 0 |

FIG. 2A-5

| F-ProgrammPart (236) | F-ProgrammEpisode (238) | F-WeatherTemp (240) |
|---|---|---|
| 6 | 0 | 3 |
| 6 | 0 | 3 |
| 6 | 0 | 3 |
| 6 | 0 | 3 |
| 6 | 0 | 3 |
| 6 | 0 | 3 |
| 6 | 0 | 3 |
| 6 | 0 | 3 |
| 6 | 0 | 3 |
| 6 | 0 | 3 |
| 6 | 0 | 3 |
| 7 | 0 | 3 |
| 7 | 0 | 3 |
| 7 | 0 | 3 |
| 7 | 0 | 3 |
| 7 | 0 | 3 |
| 7 | 0 | 3 |
| 7 | 0 | 3 |
| 7 | 0 | 3 |
| 7 | 0 | 3 |
| 7 | 0 | 3 |
| 7 | 0 | 2 |
| 7 | 0 | 2 |
| 7 | 0 | 2 |
| 7 | 0 | 2 |
| 7 | 0 | 2 |
| 8 | 0 | 2 |
| 8 | 0 | 2 |
| 8 | 0 | 2 |
| 8 | 0 | 2 |
| 8 | 0 | 2 |
| 8 | 0 | 2 |
| 8 | 0 | 2 |
| 8 | 0 | 2 |
| 8 | 0 | 2 |
| 8 | 0 | 2 |
| 8 | 0 | 2 |
| 8 | 0 | 2 |

FIG. 2A-6

| F-WeatherSun (242) | F-WeatherRain (244) |
|---|---|
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |
| 0 | 110 |

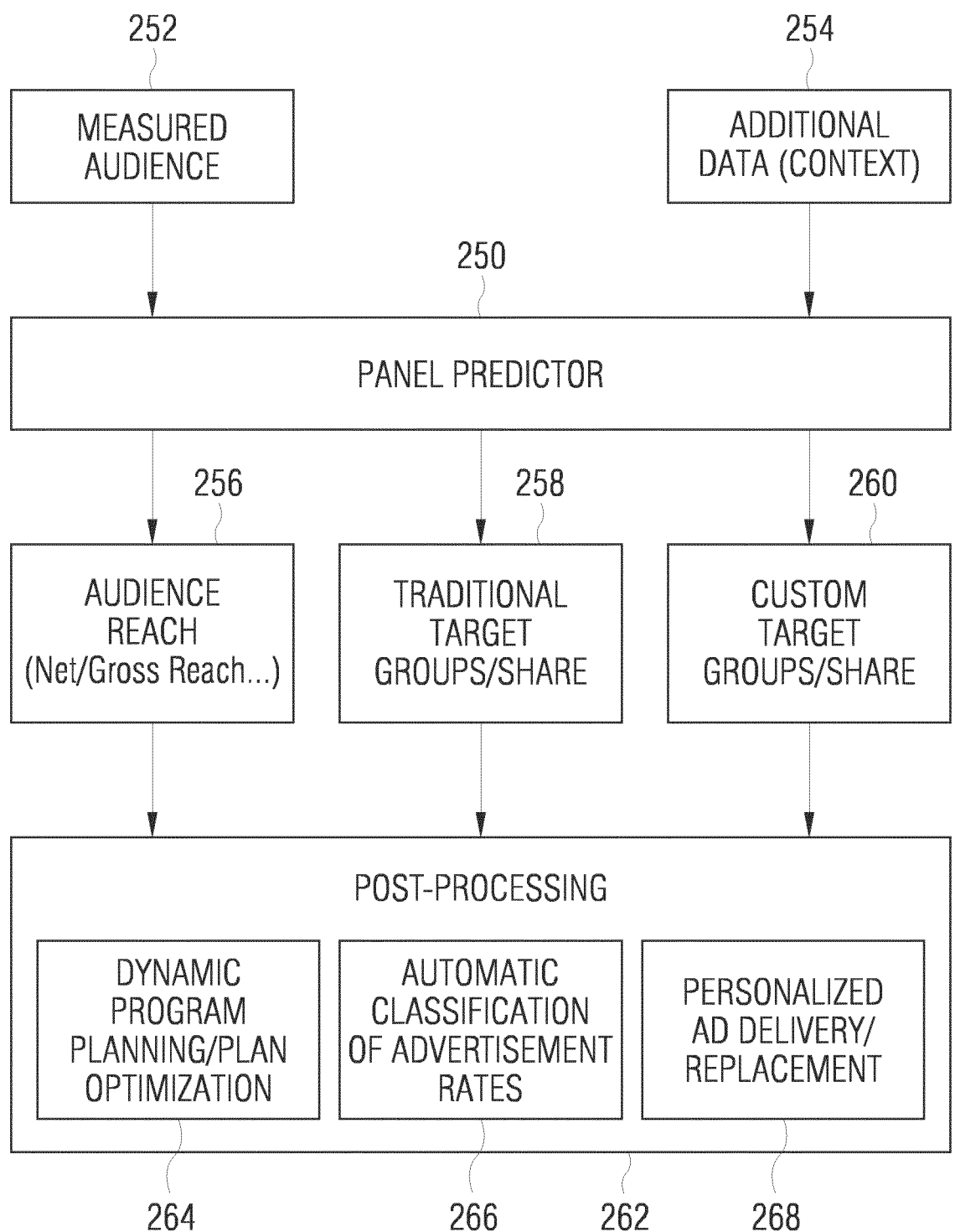

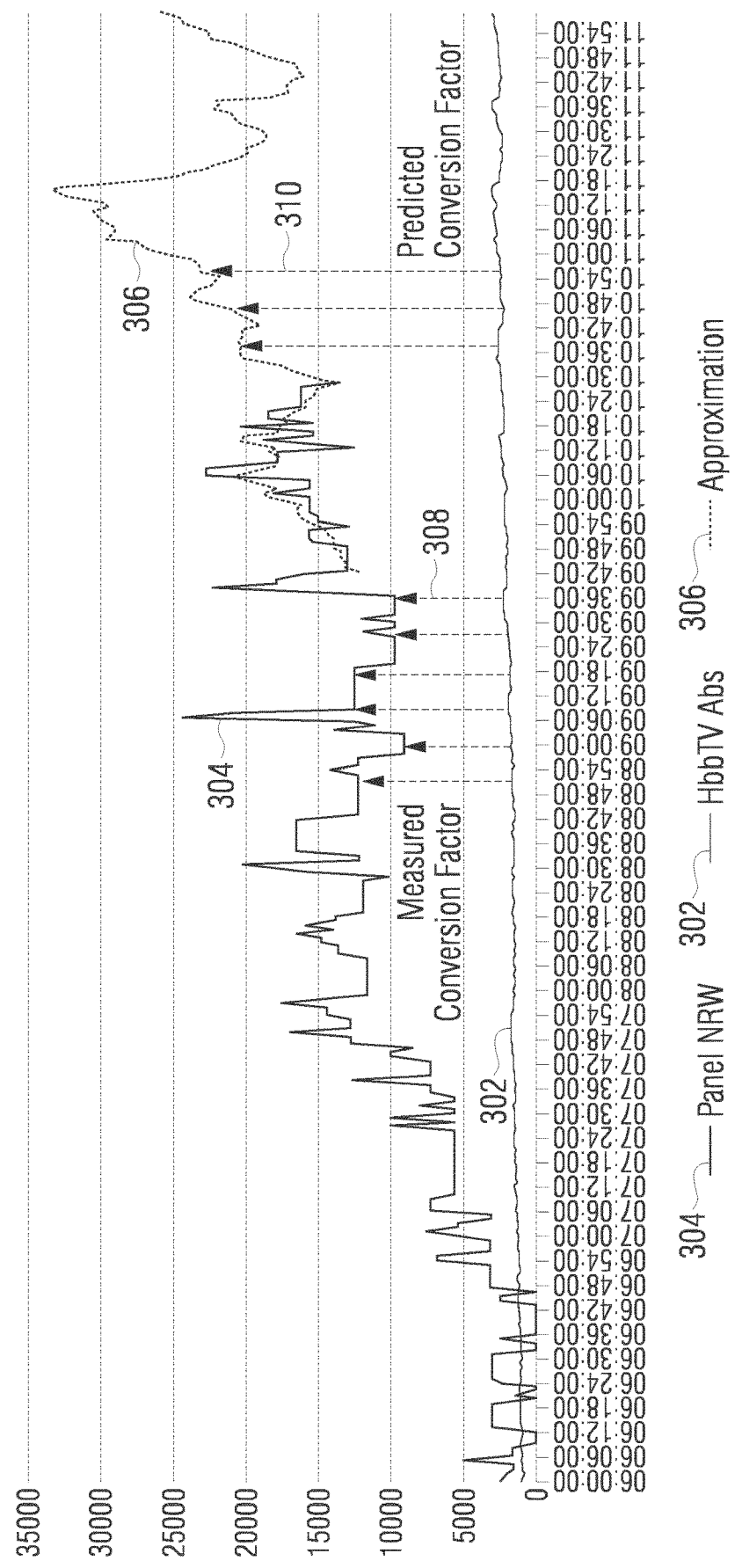

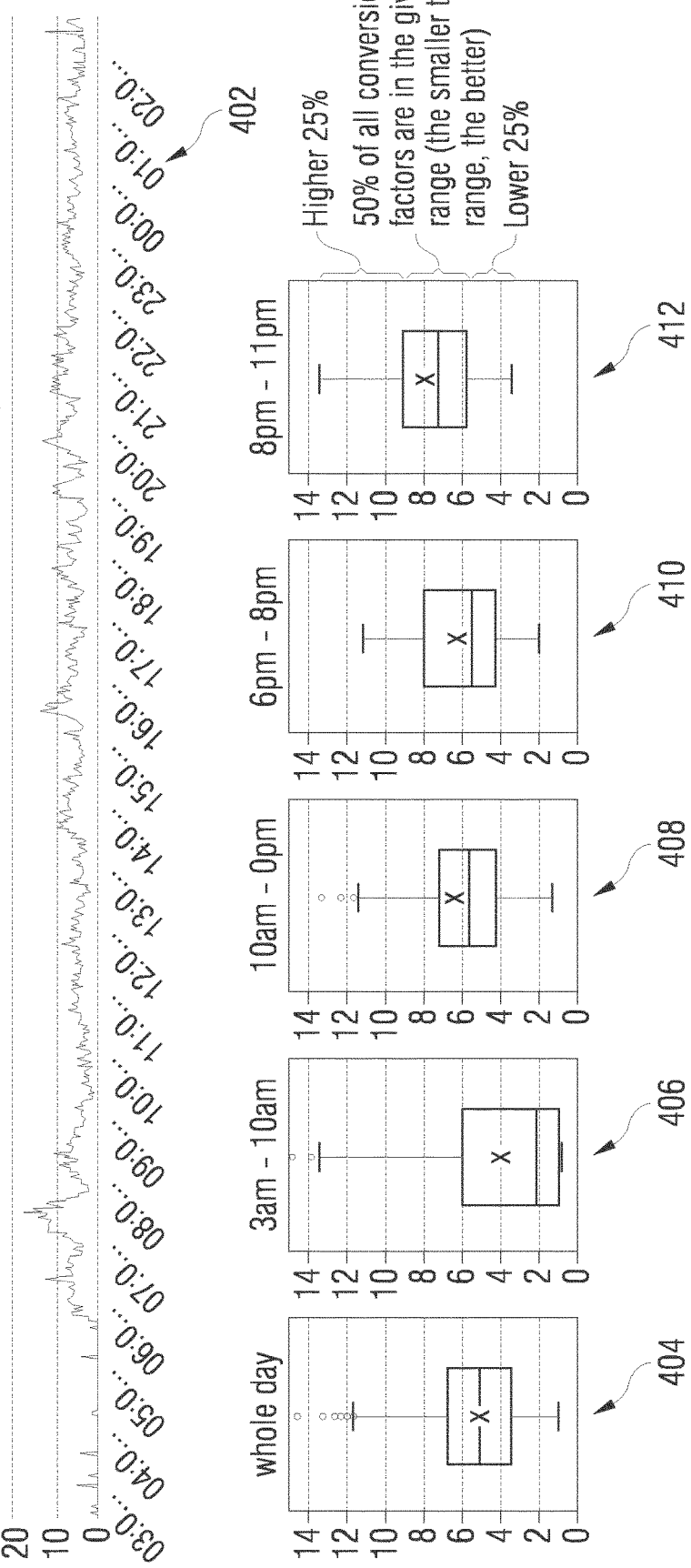

FIG. 5
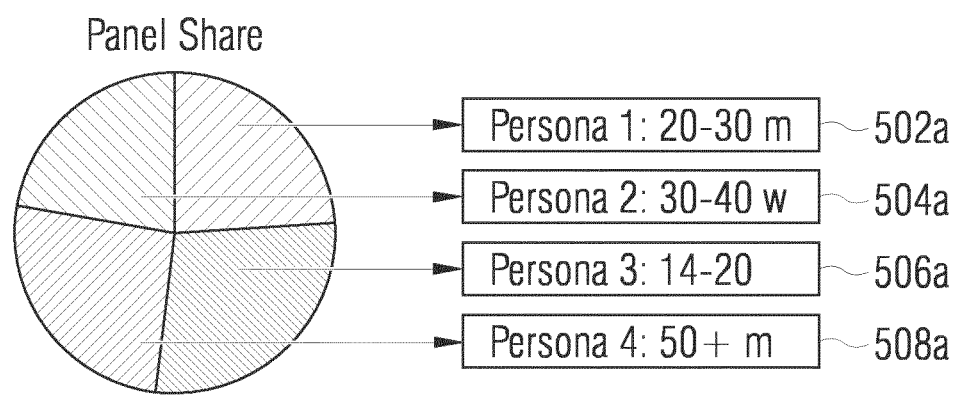
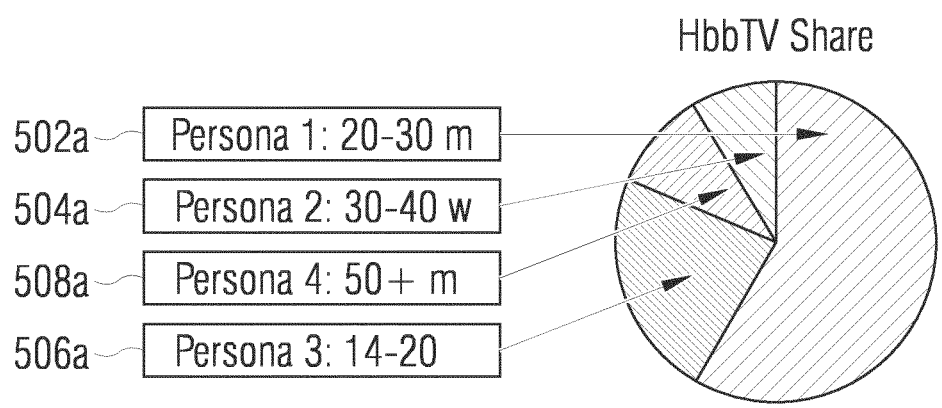

FIG. 7
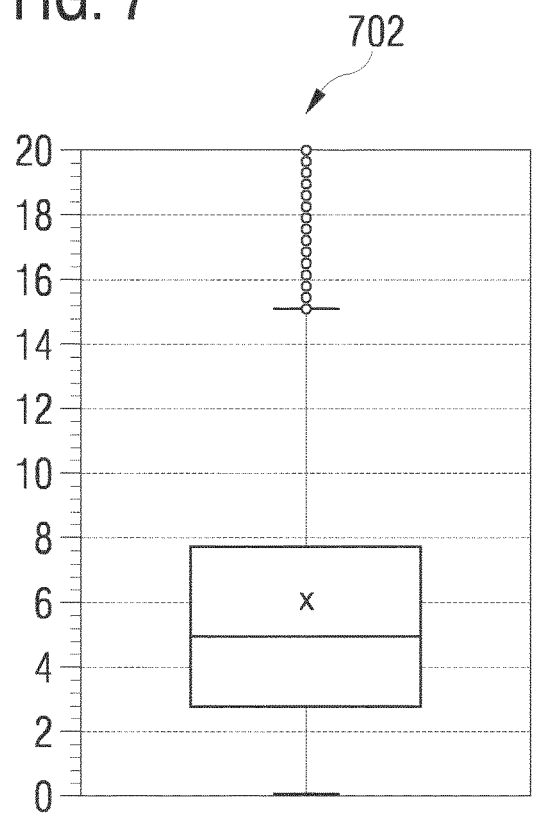
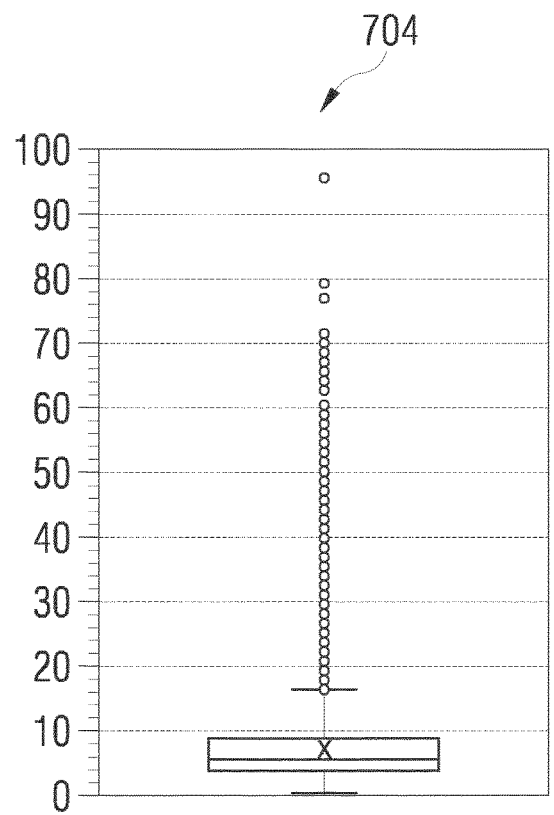

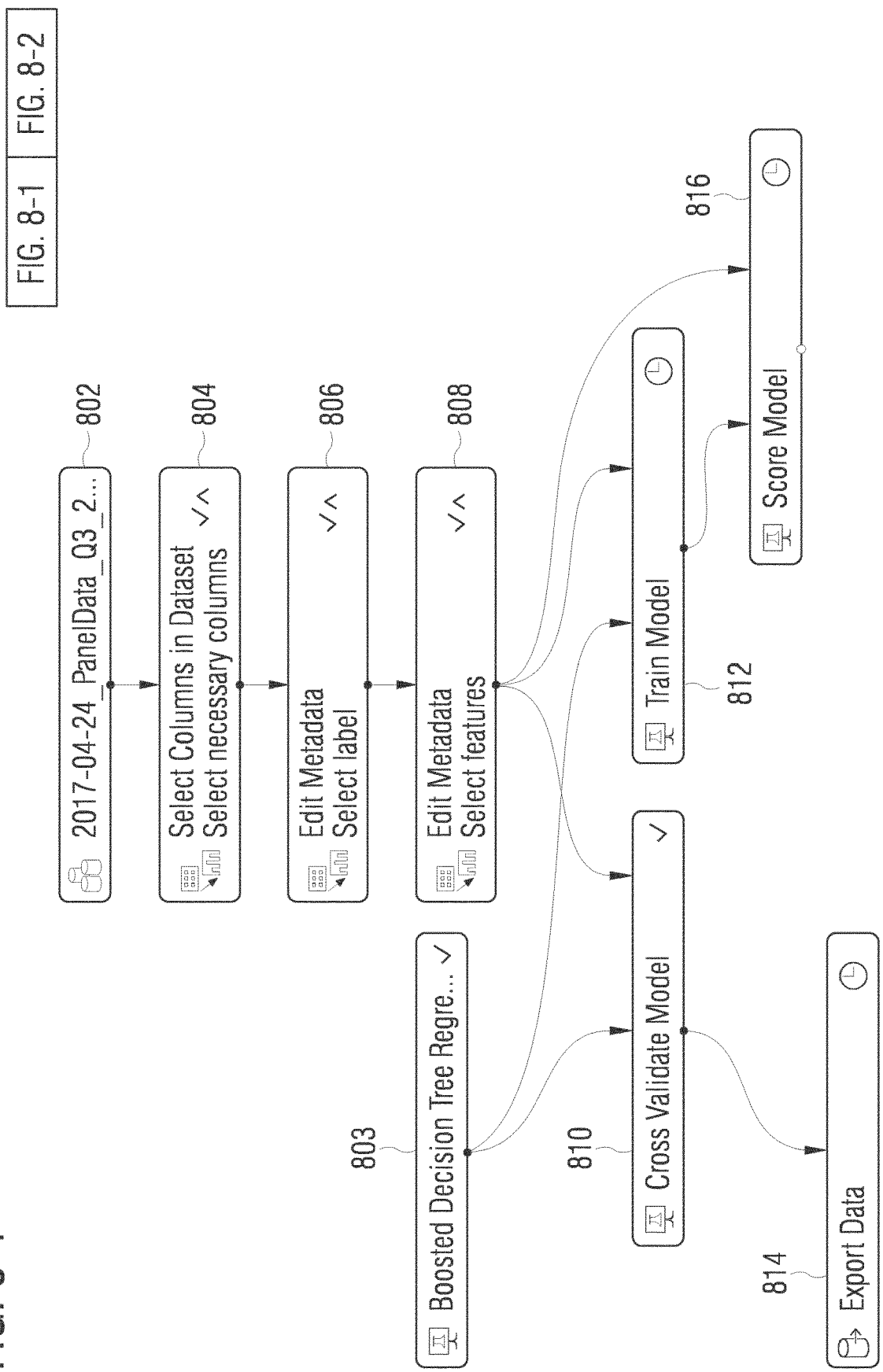

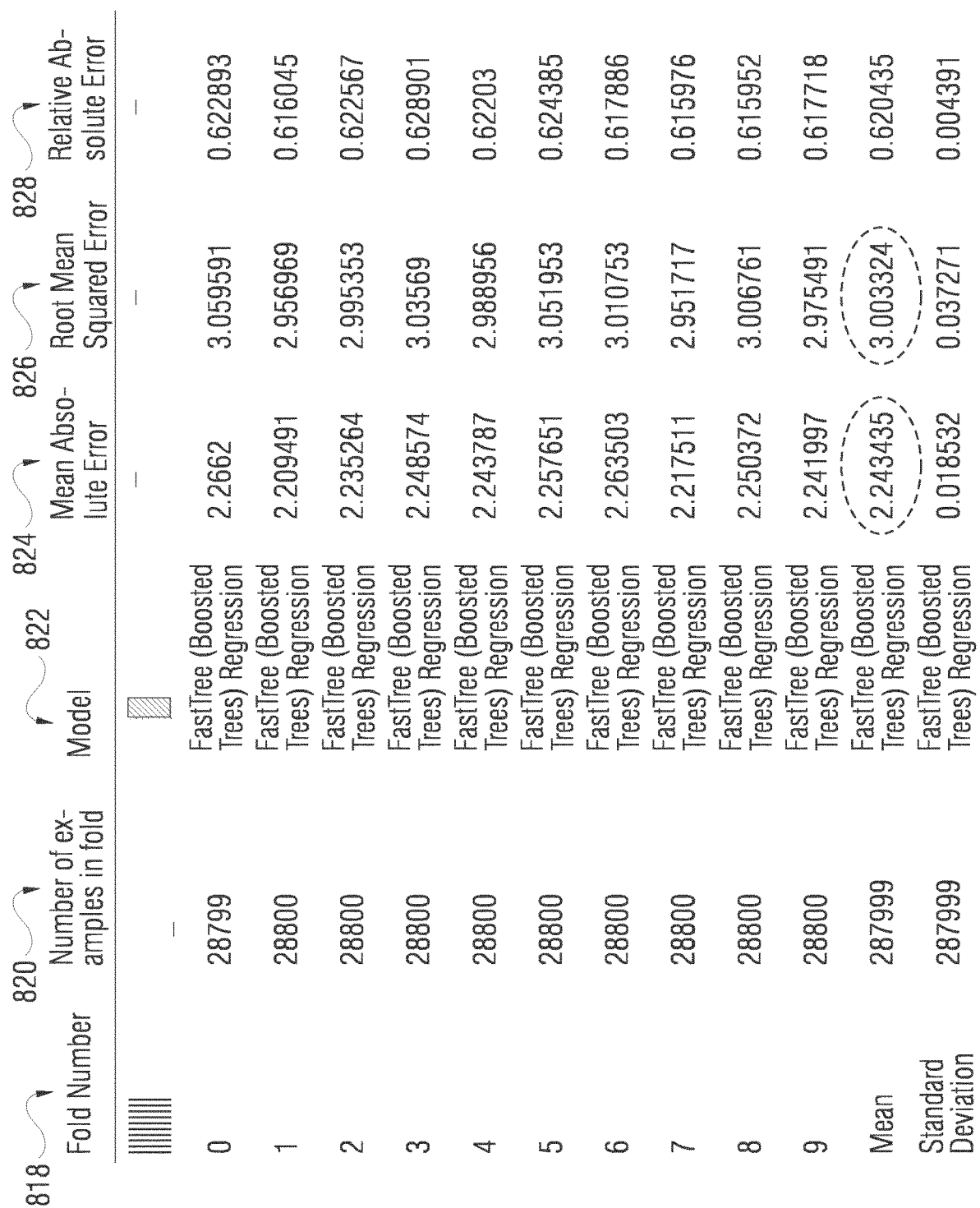

FIG. 8-2

| Fold Number | Number of examples in fold | Model | Mean Absolute Error | Root Mean Squared Error | Relative Absolute Error |
|---|---|---|---|---|---|
| 0 | 28799 | FastTree (Boosted Trees) Regression | 2.2662 | 3.059591 | 0.622893 |
| 1 | 28800 | FastTree (Boosted Trees) Regression | 2.209491 | 2.956969 | 0.616045 |
| 2 | 28800 | FastTree (Boosted Trees) Regression | 2.235264 | 2.995353 | 0.622567 |
| 3 | 28800 | FastTree (Boosted Trees) Regression | 2.248574 | 3.03569 | 0.628901 |
| 4 | 28800 | FastTree (Boosted Trees) Regression | 2.243787 | 2.988956 | 0.62203 |
| 5 | 28800 | FastTree (Boosted Trees) Regression | 2.257651 | 3.051953 | 0.624385 |
| 6 | 28800 | FastTree (Boosted Trees) Regression | 2.263503 | 3.010753 | 0.617886 |
| 7 | 28800 | FastTree (Boosted Trees) Regression | 2.217511 | 2.951717 | 0.615976 |
| 8 | 28800 | FastTree (Boosted Trees) Regression | 2.250372 | 3.006761 | 0.615952 |
| 9 | 28800 | FastTree (Boosted Trees) Regression | 2.241997 | 2.975491 | 0.617718 |
| Mean | 287999 | FastTree (Boosted Trees) Regression | 2.243435 | 3.003324 | 0.620435 |
| Standard Deviation | 287999 | FastTree (Boosted Trees) Regression | 0.018532 | 0.037271 | 0.004391 |

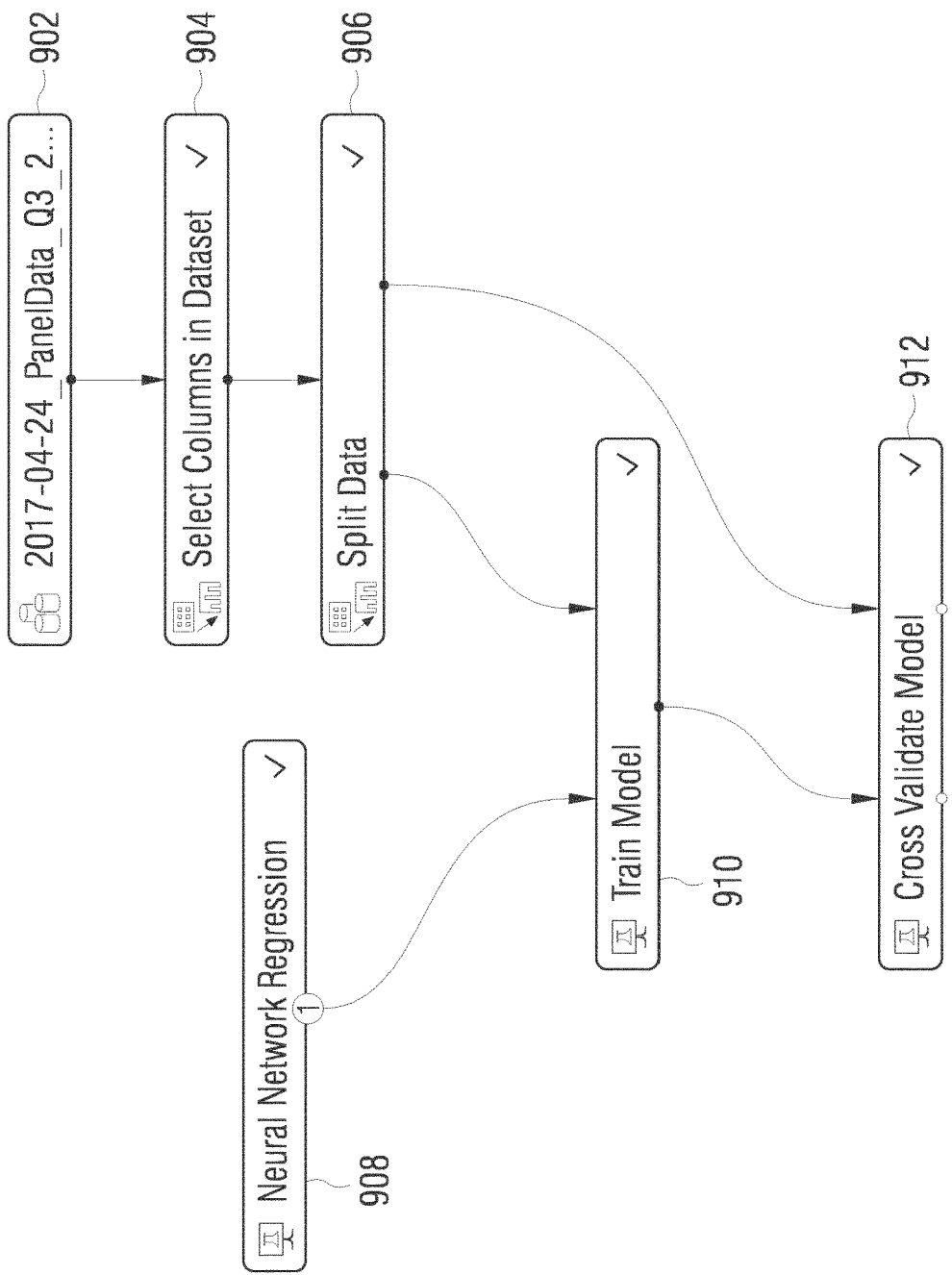

FIG. 12-1

| FIG. 12 | | |
|---|---|---|
| FIG. 12-1 | FIG. 12-2 | FIG. 12-3 |

| Attributes | F-Programm Title | F-Programm Subtitle | F-Programm AnkerId | F-Programm Type | F-Programm Start |
|---|---|---|---|---|---|
| F-ProgrammTitle | 1,00 | 0,07 | 0,47 | -0,16 | 0,29 |
| F-ProgrammSubtitle | 0,07 | 1,00 | 0,36 | 0,08 | -0,01 |
| F-ProgrammAnkerId | 0,47 | 0,36 | 1,00 | 0,00 | 0,03 |
| F-ProgrammType | -0,16 | 0,08 | 0,00 | 1,00 | 0,00 |
| F-ProgrammStart | 0,29 | -0,01 | 0,03 | 0,00 | 1,00 |
| F-ProgrammEnd | 0,25 | 0,02 | 0,03 | 0,01 | 0,87 |
| F-ProgrammDuration | 0,13 | -0,19 | 0,05 | -0,25 | 0,05 |
| F-ProgrammTarif | 0,08 | -0,06 | 0,00 | 0,18 | 0,04 |
| F-ProgrammPart | -0,06 | -0,04 | 0,02 | -0,34 | -0,07 |
| F-ProgrammEpisode | -0,32 | -0,16 | -0,10 | -0,15 | -0,19 |
| Zeit | 0,46 | 0,34 | 0,97 | -0,01 | 0,00 |
| Panel-NRW | 0,09 | 0,00 | 0,03 | 0,00 | 0,38 |
| HbbTV-Abs | 0,19 | 0,05 | 0,11 | 0,01 | 0,43 |
| ConFact-Panel | 0,10 | 0,07 | 0,07 | 0,02 | 0,12 |
| ConFact-HbbTV | -0,02 | -0,07 | -0,12 | -0,01 | 0,15 |
| F-Week | 0,41 | 0,31 | 0,90 | -0,01 | -0,03 |
| F-DayOfWeek | -0,02 | 0,03 | 0,02 | 0,01 | -0,01 |
| F-TimeOfDay | 0,28 | -0,02 | 0,01 | -0,01 | 0,98 |
| F-Holiday | 0,22 | 0,02 | 0,25 | 0,00 | 0,00 |
| F-NextDayFree | -0,04 | 0,06 | -0,01 | 0,00 | 0,00 |
| Panel-Abs | 0,09 | -0,01 | 0,02 | 0,00 | 0,39 |

FIG. 12-2

| F-Programm End | F-Programm Duration | F-Programm Tarif | F-Programm Part | F-Programm Episode | Zeit | Panel-NRW |
|---:|---:|---:|---:|---:|---:|---:|
| 0,25 | 0,13 | 0,08 | -0,06 | -0,32 | 0,46 | 0,09 |
| 0,02 | -0,19 | -0,06 | -0,04 | -0,16 | 0,34 | 0,00 |
| 0,03 | 0,05 | 0,00 | 0,02 | -0,10 | 0,97 | 0,03 |
| 0,01 | -0,25 | 0,18 | -0,34 | -0,15 | -0,01 | 0,00 |
| 0,87 | 0,05 | 0,04 | -0,07 | -0,19 | 0,00 | 0,38 |
| 1,00 | -0,02 | 0,04 | -0,04 | -0,16 | 0,00 | 0,42 |
| -0,02 | 1,00 | -0,17 | 0,01 | -0,07 | 0,03 | -0,13 |
| 0,04 | -0,17 | 1,00 | -0,23 | -0,10 | -0,01 | 0,04 |
| -0,04 | 0,01 | -0,23 | 1,00 | 0,35 | 0,00 | 0,01 |
| -0,16 | -0,07 | -0,10 | 0,35 | 1,00 | -0,11 | 0,02 |
| 0,00 | 0,03 | -0,01 | 0,00 | -0,11 | 1,00 | 0,03 |
| 0,42 | -0,13 | 0,04 | 0,01 | 0,02 | 0,03 | 1,00 |
| 0,48 | -0,19 | 0,06 | 0,03 | -0,06 | 0,11 | 0,71 |
| 0,15 | -0,12 | 0,03 | 0,02 | -0,01 | 0,06 | 0,18 |
| 0,17 | -0,02 | 0,01 | 0,03 | 0,05 | -0,12 | 0,55 |
| -0,02 | 0,02 | 0,00 | 0,00 | -0,10 | 0,92 | 0,01 |
| 0,00 | 0,01 | -0,03 | -0,05 | 0,01 | 0,02 | 0,01 |
| 0,85 | 0,07 | 0,03 | -0,09 | -0,20 | 0,01 | 0,38 |
| -0,02 | 0,06 | 0,00 | -0,02 | -0,09 | 0,25 | 0,04 |
| 0,00 | 0,03 | -0,02 | -0,04 | 0,02 | -0,01 | 0,01 |
| 0,43 | -0,13 | 0,04 | 0,02 | 0,01 | 0,01 | 0,99 |

FIG. 12-3

| Hbb TV- Abs | Con Fact- Panel | Con Fact- HbbTV | F- Week | F- DayOf Week | F- Time OfDay | F- Holi- day | F- Next DayFree | Panel- Abs |
|---|---|---|---|---|---|---|---|---|
| 0,19 | 0,10 | -0,02 | 0,41 | -0,02 | 0,28 | 0,22 | -0,04 | 0,09 |
| 0,05 | 0,07 | -0,07 | 0,31 | 0,03 | -0,02 | 0,02 | 0,06 | -0,01 |
| 0,11 | 0,07 | -0,12 | 0,90 | 0,02 | 0,01 | 0,25 | -0,01 | 0,02 |
| 0,01 | 0,02 | -0,01 | -0,01 | 0,01 | -0,01 | 0,00 | 0,00 | 0,00 |
| 0,43 | 0,12 | 0,15 | -0,03 | -0,01 | 0,98 | 0,00 | 0,00 | 0,39 |
| 0,48 | 0,15 | 0,17 | -0,02 | 0,00 | 0,85 | -0,02 | 0,00 | 0,43 |
| -0,19 | -0,12 | -0,02 | 0,02 | 0,01 | 0,07 | 0,06 | 0,03 | -0,13 |
| 0,06 | 0,03 | 0,01 | 0,00 | -0,03 | 0,03 | 0,00 | -0,02 | 0,04 |
| 0,03 | 0,02 | 0,03 | 0,00 | -0,05 | -0,09 | -0,02 | -0,04 | 0,02 |
| -0,06 | -0,01 | 0,05 | -0,10 | 0,01 | -0,20 | -0,09 | 0,02 | 0,01 |
| 0,11 | 0,06 | -0,12 | 0,92 | 0,02 | 0,01 | 0,25 | -0,01 | 0,01 |
| 0,71 | 0,18 | 0,55 | 0,01 | 0,01 | 0,38 | 0,04 | 0,01 | 0,99 |
| 1,00 | 0,12 | 0,08 | 0,09 | -0,02 | 0,43 | 0,08 | 0,00 | 0,72 |
| 0,12 | 1,00 | 0,37 | 0,06 | -0,03 | 0,12 | 0,02 | -0,02 | 0,12 |
| 0,08 | 0,37 | 1,00 | -0,13 | 0,02 | 0,15 | -0,01 | 0,02 | 0,52 |
| 0,09 | 0,06 | -0,13 | 1,00 | -0,02 | -0,01 | 0,19 | -0,05 | -0,01 |
| -0,02 | -0,03 | 0,02 | -0,02 | 1,00 | 0,00 | 0,00 | 0,85 | 0,01 |
| 0,43 | 0,12 | 0,15 | -0,01 | 0,00 | 1,00 | 0,00 | 0,00 | 0,39 |
| 0,08 | 0,02 | -0,01 | 0,19 | 0,00 | 0,00 | 1,00 | -0,08 | 0,04 |
| 0,00 | -0,02 | 0,02 | -0,05 | 0,85 | 0,00 | -0,08 | 1,00 | 0,01 |
| 0,72 | 0,12 | 0,52 | -0,01 | 0,01 | 0,39 | 0,04 | 0,01 | 1,00 |

| FIG. 13-1 | FIG. 13-2 | FIG. 13-3 |

METHOD, APPARATUS, COMPUTER PROGRAM AND SYSTEM FOR DETERMINING INFORMATION RELATED TO THE AUDIENCE OF AN AUDIO-VISUAL CONTENT PROGRAM

FIELD

Examples relate to a method, an apparatus, a computer program and a system for determining information related to an audience of an audio-visual content program, wherein more specifically, but not exclusively, the information related to the audience is determined by monitoring a subset of the audience.

BACKGROUND

Currently, TV audience rates and broadcast channel shares are primarily measured and approximated with the help of a representative audience subset (called panel)—e.g. consisting of a few thousands of participants for a country. The participants of this subset may be well-selected, acquired with incentives and equipped with special hardware. On the one hand, this is a cost-intensive approach and on the other hand, it may bear the risk of being inaccurate—especially for lower audience rates of niche programs.

At least some TV sets and set-top boxes (jointly named terminals hereinafter) offer, besides their traditional unidirectional broadcast connection for receiving classical TV broadcast programs, a second bidirectional connection for receiving Internet contents (e.g. for over-the-top contents). Moreover, the terminal may use the backward-channel of the IP-connection to send data from the terminal to a webserver. Hybrid TV technologies, such as HbbTV, may provide the ability to use both connections in parallel: a broadcaster offers additionally to the broadcasted program an IP-based (Internet-Protocol-based) overlay displaying website contents. In HbbTV, the IP-based contents are approved and provided by the broadcaster.

SUMMARY

Examples provide a method for determining information related to an audience of an audio-visual content program. The method comprises monitoring at least a subset of the audience. The method further comprises determining the information related to the audience based on the monitored subset of the audience. The information related to the audience comprises measured metrics for the subset of the audience. The method may further comprise determining at least one conversion factor based on a relationship between a property value measured within at least one previously monitored audience subsets and the corresponding property value of the previous audience. The at least one conversion factor may indicate a relationship between a property measured within the monitored subset of the audience and at least one property of the audience. The method may further comprise estimating the at least one property of the audience based on the at least one conversion factor. For examples, the at least one property of the audience may be estimated based on the information related to the audience.

Examples provide a method for determining information related to an audience of an audio-visual content program. The method comprises monitoring at least a subset of the audience. The method further comprises determining the information related to the audience based on the monitored subset of the audience and based on at least one context parameter. The at least one context parameter indicates a property of the audio-visual content program and/or conditions at a time the audio-visual context program is presented, e.g. comprising the point in time and/or the time interval of monitoring.

Monitoring the subset of the audience enables e.g. estimating the size and/or a composition of the overall (or entire) audience of the broadcast program. The at least one context parameter may e.g. be used to estimate a relationship (e.g. the ratio) between the consumption of the broadcast program by the subset of the audience and the overall consumption of the broadcast program.

Another example of a method for determining the information related to the audience of the audio-visual content program comprises monitoring at least a subset of the audience by receiving automated feedback of monitored audience devices of the monitored subset of the audience. The method further comprises determining the information related to the audience based on the automated feedback received from the monitored audience devices. The determining of the information related to the audience may further be based on at least one context parameter. The at least one context parameter indicates a property of the audio-visual content program and/or conditions at the time the audio-visual context program is presented, e.g. comprising the point in time and/or the time interval of monitoring.

Determining the information related to the audience based on the automated feedback enables e.g. gaining insights related to a net or gross reach of the audio-visual content program. The terms net reach and gross reach are defined below, e.g. within the "Facts" section.

The following examples may relate to either or both of the methods introduced above, which are both denoted "the method".

In at least some examples, the method further comprises determining at least one conversion factor, and may comprise estimating at least one property of the audience based on the at least one conversion factor. The at least one property of the audience may be determine/estimated based on information related to at least one previous audience and/or based on the at least one context parameter. The at least one conversion factor may e.g. indicate a relationship between a property measured within the monitored subset of the audience and the at least one property of the audience. The at least one property of the audience may e.g. comprise at least one element of the group of a total size of the audience, an average viewing duration, a number (an amount) of returning viewers, a number of gained viewers and number of lost viewers. For a given point in time or a given time interval, different conversion factors may apply depending on the property concerned. For a given property of the audience and a set of points in time or time intervals, different conversion factors may apply for some or all of the points in time/time intervals.

For example, the at least one conversion factor may be determined based on a relationship (e.g. a ratio) between a property value measured within at least one previously monitored audience subset and a corresponding property value of the (at least one) previous audience (or any feasible approximation of the size of the previous audience), e.g. at the same point in time. For example, one conversion factor may typically represent the ratio between the size of a subset of the audience and the corresponding total size of the audience (e.g. both based on a net reach value) at a particular point in time. Each conversion factor may be related to at least one context parameter. A set and/or subset of historic conversion factors may be represented by a mean or median value and used as a context parameter. In order to estimate and/or predict the total size of the audience at another particular point in time, a new conversion factor may be estimated and/or predicted based on the at least one context parameter at that particular point in time and, afterwards, multiplied with the size of the monitored subset of the audience.

The at least one conversion factor may be determined using a regression-based analysis and/or using an artificial neural network. Using a regression-based analysis and/or an artificial neural network enables detecting correlations between a property of a subset of the audience and a property of the (entire/total) audience.

For example, the at least one context parameter may be based on one or more elements of the group of: metadata of the audio-visual content program, information related to external conditions at the time the audio-visual content is presented, information related to weather conditions at the time the audio-visual content is presented, information on the time the audio-visual content is presented, and information related to (other) audio-visual content programs running at the time the audio-visual content is presented. Appropriately selecting one or more of the elements of the group based on experience enables a prediction of the information related to the audience with improved error values, such as mean absolute error (MAE) and/or root mean square error (RMSE).

For example, the monitoring of the subset of the audience may comprise receiving information related to an audience device identifier from monitored audience devices via a bi-directional channel. The audience device identifiers may be used to monitor the subset of the audience. In various examples, the information related to the audience device identifier may be received as part of client requests of the monitored audience devices. The request may comprise the audience device identifier, e.g. as a (HTTP) cookie.

In at least some examples, the method further comprises providing additional information related to the audio-visual content program to the monitored audience devices via the bi-directional channel. The additional information related to the broadcast program may be used to provide the subset of the audience with supplementary content and may, in conjunction with further data exchanges, enable the monitoring of the subset of the audience. Using a bi-directional channel enables receiving feedback information, e.g. the audience device identifiers, from the subset of the audience.

In various examples, the method further comprises initially assigning audience device identifiers for monitored audience devices, and providing the initially assigned audience device identifiers via the bi-directional channel to the monitored audience devices for storing on the monitored audience devices. At least some devices of audience members might not be capable of generating audience device identifiers. Using server-generated audience device identifiers may enable a more consistent monitoring of the subset of the audience.

In at least some examples, the monitoring of the subset of the audience comprises periodically receiving the information related to the audience device identifier from the monitored audience devices presenting the audio-visual content program. This enables detecting a switching of channels by the audience members of the subset of the audience.

In various examples, the determining of the information related to the audience comprises aggregating the received information related to the audience device identifier for a given audience member of the monitored subset of the audience with the (value of the) at least one context parameter over several points in time. This may provide a normalization of the information related to the audience (and of the at least one context parameter), to facilitate a subsequent processing of the information related to the audience (e.g. in relation to the at least one context parameter).

In various examples, the method further comprises clustering similar audience members of the monitored subset of the audience to determine one or more custom target groups. The custom target groups may be used to more specifically tailor the programming and/or advertisement on the broadcast program to a current or predicted audience of the audio-visual content program.

In at least some examples, the method further comprises attributing audience members of the monitored subset to a plurality of predetermined target groups (e.g. "traditional" target groups known from earlier audience information determination methods and/or "new" custom target groups already identified by applying an embodiment of this invention). This may enable a more precise prediction of both the current overall size of the audience and of a predicted future size of the audience (at a certain point in time in the future), which may enable a more appropriate determination of the points in time for advertisements. For example, the attributing of the audience members of the monitored subset may be based on at least one clustering technique and/or based on an artificial neural network. The artificial neural network may be trained based on panel data from other sources, and may subsequently determine the attribution of the audience members to the target groups. This enables an automated attribution of audience devices to the predetermined target groups.

In at least some examples, the method further comprises selecting at least one audio-visual content program element (further on just named program element) for the audio-visual content program based on the information related to the audience. This enables tailoring of the broadcast program to a predicted size and/or composition of the audience of the broadcast program.

Alternatively or additionally, the method may further comprise selecting at least one advertising element for the audio-visual content program based on the information related to the audience. This enables tailoring of the advertisements on the broadcast program to a predicted size and/or composition of the audience of the broadcast program.

For example, the at least one program element and/or the at least one advertising element may be selected for the entire audience of the audio-visual content program. Alternatively, the at least one program element and/or the at least one advertising element may be selected for at least one group of members of the audience. Alternatively, the at least one program element and/or the at least one advertising element may be selected individually for single members of the audience. Selecting the program/advertising element(s) for the entire audience enables transmitting a single audio-visual content program for the entire audience, via a unidirectional approach to deliver audio-visual contents (e.g. broadcast). Selecting the program/advertising elements per group may provide a feasible trade-off between effort to provide and positive effect in terms of audience and advertiser satisfaction. Selecting the program/advertising elements individually may increase the personalization of the audio-visual content program, but may increase the effort in providing it.

For example, the method may further comprise delivering the selected at least one program element and/or the at least one advertising element to the corresponding subset of the audience or to the entire audience. This enables personalized provision of program elements or advertising.

In at least some examples the method further comprises determining information related to a predicted total size of the audience of the audio-visual content program at a point in time in the future based on the information related to the audience. This may enable planning of the programming and/or advertising for that point in time in the future. The method may further comprise determining a predicted composition of the audience of the audio-visual content program at a point in time in the future based on the information related to the audience and/or based on the at least one context parameter effective at the point in time in the future. For example, the method may further comprise determining information related to a predicted advertising value of the point in time based on the information related to the total size of the audience and/or based on the predicted composition of the audience at the point in time. This enables automated auctioning or selling of advertising time slots. For example, the determining of a predicted total size of the audience may be based on the at least one context parameter effective at the point in time in the future.

In at least some examples the method further comprises providing at least one element of the group of information related to a predicted total size of the audience, information related to a size of the subset of the audience, information related to a predicted composition of the audience, information related to a composition of the subset of the audience, information related to attributed predetermined target groups, information related to clustered custom target groups and information related to a predicted advertising value via a bi-directional channel, e.g. in real-time. For example, the method may comprise providing at least one element of said group to a set of devices, e.g. to a least a subset of the monitored audience devices and/or to other devices (e.g. as a web site to a computer, to a tablet computer or to a smartphone, or to a mobile application of a smartphone or tablet computer). This may enable audience members and other persons receiving said information to access statistics about the audience.

Examples further comprise a computer program having program code for performing the method according to one or more of the previous examples, when the computer program is executed on a computer, a processor, or a programmable hardware component.

Examples further comprise an apparatus for determining information related to the audience of an audio-visual content program. The apparatus comprises at least one interface configured to receive information related to a subset of the audience of the audio-visual content program. The apparatus further comprises a control module configured to monitor the subset of the audience using the at least one interface. The control module is further configured to determine the information related to the audience based on the monitored subset of the audience and based on at least one context parameter. The at least one context parameter indicates a property of the audio-visual content program and/or conditions at a time the audio-visual context program is presented.

Another example of the apparatus comprises at least one interface configured to (indirectly or directly) receive automated feedback of monitored audience devices of the monitored subset of the audience. The apparatus further comprises a control module configured to monitor the subset of the audience using the at least one interface and to determine the information related to the audience based on the automated feedback received from the monitored audience devices. The determining of the information related to the audience may further be based on at least one context parameter. The at least one context parameter indicates a property of the audio-visual content program and/or conditions at the time the audio-visual context program is presented, e.g. comprising the point in time and/or the time interval of monitoring.

Examples further comprise a system for receiving information related to an audience device identifier from a monitored subset of the audience of an audio-visual content program. The system comprises one or more (e.g. stateless) receiving entities configured to extract a plurality of audience device identifiers of the monitored subset of the audience from a plurality of periodic activity beacons received from monitored audience devices of the monitored subset of the audience, and to provide information related to the plurality of audience device identifiers to one or more session tracking entities. The system further comprises one or more session tracking entities configured to determine information related to durations of individual sessions of consumption of the audio-visual content program by the monitored subset of the audience based on the plurality of audience device identifiers, and to provide preliminary information related to the durations of the individual sessions to a data storage entity. The system further comprises at least one data storage entity configured to store information related to the durations of the individual sessions within a database or within a logging system.

The system enables processing of audience device identifiers from a large number of audience devices, e.g. when the audience is particularly large.

In various examples, the system further comprises the apparatus as introduced above. The information related to the audience of the audio-visual content program may be determined based on the information related to the duration of the sessions stored within the database or within the logging system.

BRIEF DESCRIPTION OF THE FIGURES

Some examples of apparatuses and/or methods will be described in the following by way of example only, and with reference to the accompanying figures, in which

FIG. 1c shows a further flow chart of a method for determining information related to the audience of an audio-visual content program;

FIG. 1d shows a block diagram of a system;

FIG. 2a shows a table of data usable for the prediction of audience rates;

FIG. 2b shows a block diagram of a panel predictor according to an embodiment;

FIG. 4 illustrates conversion factors over a sample day;

FIG. 5 shows a clustering of traditional target groups by the users' behavior;

FIG. 7 shows a total range of conversion factors according to an example;

FIG. 8 shows a model of a decision tree and a mean absolute error and a root mean square error for a trained decision tree of an example;

FIG. 12 illustrates a correlation matrix according to an example.

DETAILED DESCRIPTION

Various examples will now be described in detail with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives and especially all feasible combinations of the described method features falling within the scope of the disclosure. Equal numbers refer to equal or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than two elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use multiple elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
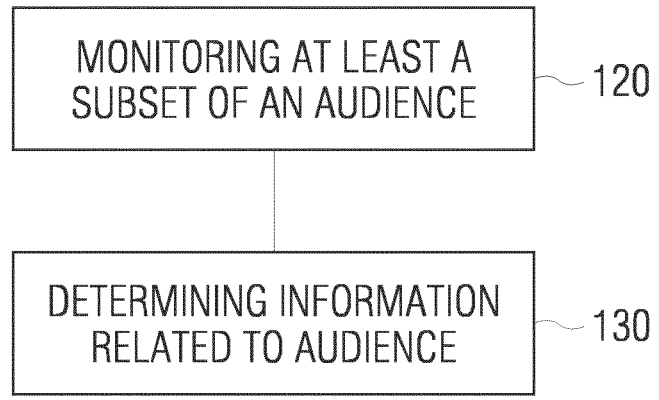
FIG. 1a shows a flow chart of a method for determining information related to the audience of an audio-visual content program.
Figure 1B:
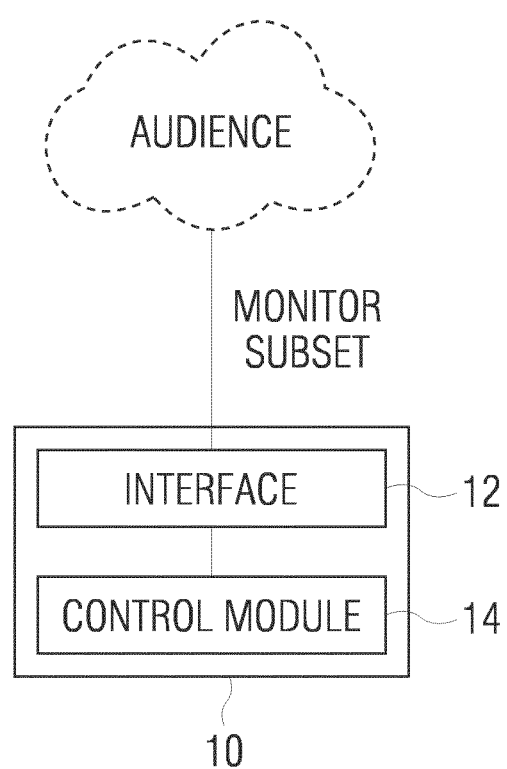
FIG. 1b shows a block diagram of an apparatus for determining information related to the audience of an audio-visual content program.

FIG. 1a shows a flow chart of a method for determining information related to the audience of an audio-visual content program. FIG. 1b shows a block diagram of a corresponding apparatus 10 for determining the information related to the audience of the audio-visual content program. The apparatus 10 comprises at least one interface 12, configured to receive information related to a subset of the audience of the audio-visual content program, e.g. to receive automated feedback of monitored audience devices of the monitored subset of the audience. The apparatus 10 further comprises a control module 14 configured to execute the method steps of the corresponding method.

The method comprises monitoring 120 at least a subset of the audience. In at least some examples, the monitoring 120 comprises receiving automated feedback of monitored audience devices of the monitored subset of the audience. The method further comprises determining 130 the information related to the audience based on the monitored subset of the audience. In various examples the determining 130 is further based on at least one context parameter. The at least one context parameter indicates a property of the audio-visual content program and/or conditions at the time the audio-visual context program is presented.

In at least some examples, the audio-visual content program may be a (linear) video stream (with corresponding audio), e.g. a (television) broadcast program. The audio-visual content program may be distributed via one or more different distribution channels, e.g. via analog or digital cable, terrestrial or satellite television or via the internet. For example, additional information related to the audio-visual content program may be distributed via the internet (e.g. information formerly transmitted via teletext). The additional information may for example comprise a description of the audio-visual content program, subtitles of the audio-visual content program, advertisements to be inserted or overlaid over the audio-visual content program and/or miscellaneous other information, e.g. scripts to be executed by audience devices of the (monitored subset of) the audience. For example, the information related to the audience may comprise measured metrics for the subset of the audience (e.g. a net reach within the monitored subset or a gross reach (of audience devices/audience members/audience households) within the monitored subset, an average viewing duration within the subset, a number of returning viewers within the subset, a number of gained viewers within the subset or a number of lost viewers within the subset). Additionally or alternatively, the information related to the audience may comprise estimated metrics for the (entire) audience (e.g. an estimated net reach within the audience or an estimated gross reach (of audience devices/audience members/audience households) within the audience, an estimated average viewing duration within the audience, an estimated number of returning viewers within the audience, an estimated number of gained viewers within the audience or an estimated number of lost viewers within the audience).

In various examples, the monitoring 120 may monitor a subset of the audience (e.g. the subset of the audience watching the audio-visual content program via a specific delivery method, e.g. via HbbTV (Hybrid Television)) or the entire audience. For example, the subset of the audience may be monitored to deduct a consumption of the audio-visual content program by the entire audience (e.g. a net reach or a gross reach of the entire audience) from the consumption of the subset of the audience. The monitoring 120 may comprise receiving usage indicators (e.g. the automated feedback) of (e.g. from) the monitored audience devices of the monitored subset of the audience. For example, the automated feedback may comprise periodic beacons from the audience devices of the (monitored) subset of the audience, e.g. periodic audience device identifiers sent by the audience devices of the monitored subset of the audience. Audience devices may be presentation devices (e.g. internet-connected televisions) used by audience members of the subset of the audience.

In various examples (as shown in FIG. 1c), the method may further comprise providing 110 additional information related to the audio-visual content program to the monitored audience devices via a bi-directional channel (e.g. via the internet or via another bi-direction network).

For example, the additional information may comprise hypertext content, e.g. a hypertext markup language (HTML) document comprising a script to be executed by the audience devices. The additional information may comprise a tracking script, e.g. a plurality of programming/scripting instructions to be executed by the audience devices of the subset of the audience. For example, the additional information may comprise instructions for the audience devices of the subset of the audience to contact a server or plurality of servers (e.g. the apparatus 10) executing the method. The script and/or the instructions may comprise an instruction causing audience devices of the subset of the audience to request, download and/or display at least a part of the additional information (e.g. an invisible tracking/counting pixel) from a server, e.g. from the apparatus executing the method. For example, the monitoring 120 of the subset of the audience may comprise receiving information related to an audience device identifier from monitored audience devices via the bi-directional channel. For example, the information related to the audience device identifier may comprise a plurality of audience device identifiers from the monitored audience devices, e.g. multiple times the same audience device identifier from each monitored audience device over time. In various examples, an audience device identifier may (uniquely) identify an audience device of an audience member of the subset of the audience. For example, the audience device identifier may be stored in a cookie on the audience device, e.g. within a persistent cookie. The information related to the audience device identifier may be received as part of client requests of the monitored audience devices. For example, the client request may comprise the audience device identifier stored within the cookie. In various examples, the method may further comprise initially assigning audience device identifiers for monitored audience devices (e.g. the audience device identifiers to be stored as/within cookies stored on the audience devices). The method may comprise providing the initially assigned audience device identifiers via the bi-directional channel to the monitored audience devices for storing (e.g. as/within cookies) on the monitored audience devices. The monitoring of the subset of the audience may comprise periodically receiving the information related to the audience device identifier from the monitored audience devices presenting the audio-visual content program. The script and/or the instructions may comprise an instruction causing audience devices of the subset of the audience to periodically request, download and/or display at least a part of the additional information (e.g. an invisible tracking/counting pixel) from a server, e.g. from the apparatus executing the method.

In various examples, the determining of the information related to the audience comprises aggregating the received information related to the audience device identifier for a given audience member of the monitored subset of the audience with the at least one context parameter over a plurality of points in time. For example, the determining of the information related to the audience may comprise detecting individual sessions of consumption of the audio-visual content program for a given audience member. For example, the individual sessions may span a plurality of points in time. The determining of the information related to the audience may comprise storing information related to the durations of the individual sessions within a database or within a logging system. For example, the information related to the durations of the individual sessions may comprise the aggregated received information related to the audience device identifier. For example, the determining of the information related to the audience may be based on the stored information related to the durations of the individual sessions and/or based on the aggregated received information related to the audience device identifier.

In at least some examples, the method further comprises clustering one or more similar audience members of the monitored subset of the audience to determine one or more custom target groups. For example, the one or more custom target groups might not be based on age group and/or gender. The one or more custom target groups may indicate an interest or a consumption pattern of audience devices assigned to the one or more custom target groups. The clustering may identify the custom target groups of similar audience members based on the received information related to an audience device identifier and based on the at least one context parameter, e.g. by identifying similar consumption patterns when context parameters change (e.g. if the weather changes or if the program of the audio-visual content program changes). In various examples, the custom target groups might not be comprised in a plurality of predetermined target groups (as introduced below). For example, the custom target groups may be generated automatically based on the clustering of the audience members.

In at least some examples, the method may further comprise attributing audience members of the monitored subset to the plurality of predetermined target groups (e.g. assigning none, some, or all individual monitored audience devices or audience members of the monitored subset to one or more of the plurality of predetermined target groups), e.g. based on the received information related to the audience device identifier and based on the at least one context parameter. For example, the predetermined target groups may be mutually separated based on at least one element of the group of an (estimated) age or age group an (estimated) gender, an (estimated) income, an (estimated) profession, and/or an (estimated) level of education of an audience member associated with an audience device of the monitored subset of the audience. In at least some examples, the predetermined target groups may be disjoint sets. Custom target groups may be non-disjoint sets. In various examples, the method may further comprise attributing audience members of the monitored subset to the one or more custom target groups, e.g. after determining the one or more custom target groups. For example, the attributing of the audience members of the monitored subset may be based on at least one clustering technique and/or based on an artificial neural network. For example, the at least one clustering technique may be used to cluster audience devices/audience members of the monitored subset of the audience into estimated age groups/gender groups, and to attribute the audience members of the monitored subset to the plurality of predetermined target groups based on the estimated age groups/gender groups. For example, the at least one clustering technique may be used to cluster audience devices/audience members of the monitored subset of the audience into estimated behavioral groups, and to attribute the audience members of the monitored subset to the one or more custom target groups based on their behavior. For example, the audience members may be clustered based on demographic data by comparing a behavior of audience members of the monitored subset with known behaviors of audience members, for which demographic information is available. For example, the artificial neural network may be used to assign the audience members of the monitored subset to the corresponding pre-determined target group(s) of the plurality of target groups and/or to the corresponding custom target groups using the received information related to the audience device identifiers and the at least one context parameter as inputs. For example, the artificial neural network may be pre-trained to identify the membership of the plurality of pre-determined target groups and/or the membership of the one or more custom target groups based on usage patterns of audience devices related to specific context parameters.

The at least one context parameter indicates at least one property of the audio-visual content program and/or at least one condition at the time the audio-visual context program is presented. For example, the at least one property of the audio-visual context program may comprise metadata of program elements, e.g. a description of the program elements, a genre of the program elements, information related to one or more actors of the program elements, information related to a type of the program elements (commercial, movie, series etc.), information related to an episode of a series, information related to an advertising rate and/or information related to a time the program elements are presented. For example, the information related to the time the program elements are presented may comprise at least one element of a month, a day, a weekday, time of day, season and whether it is a holiday (or whether the next day is a holiday). The at least one condition at the time the audio-visual context program is presented may e.g. comprise information related to external conditions, e.g. weather conditions and/or other audio-visual content programs running simultaneously. For example, the weather conditions may be valid for the entire region the audio-visual content program is presented or for a sub-region. The weather conditions may comprise information related to at least one element of the group of a temperature, hours of sunshine and an amount of precipitation.

The at least one context parameter may be based on one or more elements of the group of metadata of the audio-visual content program, known sizes of the audience, information related to external conditions at the time the audio-visual content is presented, information related to weather conditions at the time the audio-visual content is presented, information on the time the audio-visual content is presented, and information related to audio-visual content programs running at the time the audio-visual content is presented. In some examples, the at least one context parameter may comprise a net reach or gross reach of the panel (e.g. over a plurality of points in time), a net reach or gross reach of the monitored subset (e.g. over a plurality of points in time), a composition of the panel and information related to individual audience members of the monitored subset (e.g. audience device identifier, location, audience device, audio-visual content program placement). At a point in time, the audio-visual content program may have more than one context parameter. For example, at a point in time, the audio-visual content program may have a context parameter related to the weather at the point in time, a context parameter related to a genre of the audio-visual content program at the point in time and a context parameter related to concurrently running audio-visual content programs at the point in time. In at least some examples, the terms "context parameter" and "value of the context parameter" may be used interchangeably. For example, if a context parameter is used to determine another value, its value and/or its designator/identifier may be used as a basis.

In at least some examples, the method further comprises determining at least one conversion factor. For example, the at least one conversion factor may be determined based on information related to at least one previous audience and/or based on the at least one context parameter. The at least one conversion factor may indicate a relationship between at least one property measured within the monitored subset of the audience and at least one property of the audience. The at least one conversion factor may be determined based on a relationship (e.g. a ratio) between at least one property value measured within at least one previously monitored audience subset and the corresponding property value(s) of the (at least one) previous audience. In various examples, the at least one property of the audience comprises at least one element of the group of a (e.g. predicted or calculated) total size of the audience, an average viewing duration (e.g. calculated over a plurality of sessions and/or audience members), a number of returning viewers (e.g. viewers, that temporarily quit consuming the audio-visual content program), a number of gained viewers (for the audio-visual content program) and a number of lost viewers (for the audio-visual content program). For example, the at least one conversion factor may comprise at least two conversion factors indicating at least two ratios between the monitored subset of the audience and a net reach and a gross reach (e.g. of audience devices, audience members, audience households) of the audio-visual content program over the entire audience. The method may further comprise estimating the at least one property of the audience based on the at least one conversion factor.

In some examples, the at least one conversion factor is determined using a regression-based analysis, e.g. by statistically analyzing previously monitored audience subsets and corresponding previous total sizes of the audience (e.g. related to various context parameters). FIG. 12 shows a data set of a feature correlation analysis, which may be used for determining conversion factors. In FIG. 12, 0 means no correlation, 1 means proportional and −1 antiproportional correlation between the factors of the rows and columns of FIG. 12. Correlations and dependencies between past conversion factors and a set of context parameters (e.g. the rows and columns of FIG. 12) may be determined and trained for future estimations/predictions by a supervised learning algorithm. In FIG. 12, the rows/columns are program title, program subtitle, program anchor identifier, program type, program start, program end, program duration, program rate, program part, program episode, time, panel net reach, HbbTV absolute numbers, conversion factor panel, conversion factor HbbTV, week, time of day, whether it is a holiday, whether the next day is free and the absolute values of the panel.

Alternatively or additionally, the at least one conversion factor may be determined using an artificial neural network. The method may comprise training the artificial neural network, e.g. using the at least one context parameter and the relationship/ratio between corresponding properties measured within at least one previously monitored subset of the audience and the corresponding previous properties of the entire audience as training input. The method may comprise estimating a total size of the audience of the audio-visual content program based on the at least one conversion factor and based on the information related to the audience, e.g. by multiplying a net reach or gross reach measured within the monitored subset with the at least one conversion factor. For example, the method may comprise estimating the at least one property of the audience in real time, e.g. less than 4 hours (or less than 2 hours, less than 1 hour less than 30 minutes, less than 20 minutes, less than 10 minutes, less than 5 minutes, less than 1 minute, less than 20 seconds, less than 10 seconds) after an audio-visual content program element is presented, e.g. for displaying the total size of the audience (or any other data generated by the apparatus or the system) in real time. In an exemplary embodiment, the property of the audience is estimated less than 10 seconds after the audio-visual content program element is presented.

In at least some examples, the method may further comprise providing information related to the total size of the audience (e.g. to the monitored audience devices) as part of the additional information related to the audio-visual content program. For example, the method may further comprise providing at least one element of the group of information related to a predicted (e.g. estimated or calculated) total size of the audience, information related to a (e.g. monitored, determined, estimated and/or predicted) size of the subset of the audience, information related to a predicted (e.g. estimated or calculated) composition of the audience, information related to a (e.g. monitored, determined, estimated and/or predicted) composition of the subset of the audience, information related to attributed predetermined target groups, information related to clustered custom target groups and information related to a predicted advertising value via the bi-directional channel (or another bi-directional channel), e.g. in real-time (less than 4 hours (or less than 2 hours, less than 1 hour less than 30 minutes, less than 20 minutes, less than 10 minutes, less than 5 minutes, less than 1 minute, less than 20 seconds, less than 10 seconds) after an audio-visual content program element is presented), to be displayed by audience devices of the monitored subset. For example, the method may additionally/alternatively comprise providing at least one element of said group to a set of devices, e.g. to a least a subset of the monitored audience devices and/or to other devices (e.g. as a web site to a computer, to a tablet computer or to a smartphone, or to a mobile application of a smartphone or tablet computer). For example, the information related to the estimated/predicted total size of the audience or the information related to the estimated/predicted composition of the audience may be displayed by audience devices of the monitored subset overlaid over the audio-visual content program, and might be accessed using a password.

In various examples (as shown in FIG. 1c), the method may further comprise selecting 140 at least one audio-visual content program element (for short: program element) for the audio-visual content program based on the information related to the audience. For example, the at least one program element may be a television program content segment. For example, the selecting 140 of the at least one program element may be based on a current or predicted composition of the audience (e.g. based on the predicted composition of the audience at a point in time in the future). In at least some examples, the at least one program element may be selected in real-time, e.g. less than 4 hours (or less than 2 hours, less than 1 hour, less than 30 minutes, less than 20 minutes, less than 10 minutes, less than 5 minutes, less than 1 minute, less than 30 seconds, less than 10 seconds) before it is presented.

The method may further comprise selecting 150 at least one advertising element for the audio-visual content program based on the information related to the audience. For example, the selecting 150 of the at least one advertising element may be based on a current or predicted composition of the audience (e.g. based on the predicted composition of the audience at a point in time in the future). The at least one advertising element may be a commercial for example. The at least one advertising element may interrupt the content program of the audio-visual content program. Alternatively or additionally, the at least one advertising element may be presented alongside the content program of the audio-visual content program. In at least some examples, the at least one advertising element may be selected in real-time, e.g. less than 4 hours (or less than 2 hours, less than 1 hours, less than 30 minutes, less than 20 minutes, less than 10 minutes, less than 5 minutes, less than 1 minute, less than 30 seconds, less than 10 seconds) before it is presented. In various examples, the selecting 150 of the at least one advertising element comprises determining at least one of a desired duration of advertising elements, a desired number of advertising elements, and a composition of the audience to select 150 the at least one advertising element.

In at least some examples, the at least one program element and/or the at least one advertising element (for short: the at least one program/advertising element) may be selected (e.g. and delivered) for the entire audience of the audio-visual content program. For example, the at least one program/advertising element may be delivered/distributed using analog or digital, cable, terrestrial or satellite television or Internet Protocol-based television (IPTV) to the entire audience.

Alternatively, the at least one program/advertising element may be selected (e.g. and delivered) for at least one group of members of the audience. For example, the at least one program/advertising element may be selected (e.g. and delivered) according to an association to one of the predetermined and/or new target groups. For example, the at least one advertising element and/or the at least one program element may be delivered to the at least one group of members of the audience via the internet.

Alternatively, the at least one program/advertising element may be selected individually for single members of the audience, e.g. based on their attribution to the one or more custom target groups (or to the plurality of predetermined target groups. For example, the at least one program/advertising element may be delivered to the single members of the audience via the internet.

The method may further comprise delivering the selected at least one program/advertising element to the corresponding subset of the audience or to the entire audience, e.g. via the bi-directional channel or via broadcasting. For example, the delivering of the at least one program/advertising element may comprise transmitting the at least one program/advertising element individually to the corresponding subset of the audience, or broadcasting/multicasting the at least one program/advertising element to the subset of the audience or to the entire audience (e.g. similar to the additional information).

In various examples, the method further comprises determining 160 information related to a predicted total size of the audience of the audio-visual content program at a point in time in the future (for short: predicted future audience size) based on the information related to the audience, e.g. based on past, learned or trained information related to the audience. For example, the determining 160 of the information related to a predicted future audience size may further be based on at least one context parameter effective at the point in time in the future. For example, the determining 160 of the information related to a predicted future audience size may further or alternatively be based on at least one conversion factor effective at the point in time in the future (which in turn may be based on at least one context parameter effective at the point in time in the future). The information related to a predicted future audience size may especially be based on an estimated size of the monitored subset of the audience at the point of time in the future and/or at least one conversion factor at the point of time in the future.

In at least some examples, the method may further comprise determining a predicted composition of the audience of the audio-visual content program at a point in time in the future based on the information related to the audience and/or based on the at least one context parameter effective at the point in time in the future, e.g. based on past, learned or trained information related to the audience. For example, the determining of the predicted composition of the audience may further or alternatively be based on at least one conversion factor effective at the point in time in the future (which in turn may be based on at least one context parameter effective at the point in time in the future).

For example, the method may further comprise determining information related to a predicted advertising value of the point in time in the future based on the predicted future audience size and on the predicted composition of the audience at the point of time in the future. The composition of the audience at the point of time in the future may be predicted based on at least one context parameter effective at the point of time in the future.

The at least one interface 12 may correspond to one or more inputs and/or outputs for receiving and/or transmitting information, which may be in digital (bit) values according to a specified code, within a module, between modules or between modules of different entities. The control module 14 may be implemented using one or more processing units, one or more processing devices, any means for processing, such as a processor, a computer or a programmable hardware component being operable with accordingly adapted software. In other words, the described function of the control module 14 may as well be implemented in software, which is then executed on one or more programmable hardware components. Such hardware components may comprise a general purpose processor, a Digital Signal Processor (DSP), a micro-controller, etc.

FIG. 1d shows a block diagram of a system 20 for receiving the information related to an audience device identifier from the monitored subset of the audience of the audio-visual content program.

The system comprises one or more receiving entities 22 configured to extract a plurality of audience device identifiers from a plurality of periodic activity beacons received from monitored audience devices. For example, the one or more receiving entities 22 may be stateless receiving entities, e.g. the one or more receiving entities might not store information related to previously received audience device identifiers. For example, the plurality of audience device identifiers may be comprised in the information related to the audience device identifier of the monitored subset of the audience. The plurality of periodic activity beacons may be sent by the monitored audience devices periodically requesting or downloading at least parts of the additional information. For example, the plurality of audience device identifiers may be stored within cookies at the monitored audience devices. The one or more receiving entities 22 may be configured to discard elements from the plurality of periodic activity beacons unrelated to the plurality of audience device identifiers. The one or more receiving entities 22 are configured to provide information related to the plurality of audience device identifiers to one or more session tracking entities 24. For example, the one or more receiving entities 22 may be configured to transmit the plurality of audience device identifiers to the one or more session tracking entities 24, e.g. without permanently storing the plurality of audience device identifiers.

The system 20 further comprises the one or more session tracking entities 24 configured to determine information related to durations of individual sessions of consumption of the audio-visual content program by the monitored subset of the audience based on the plurality of audience device identifiers. For example, the one or more session tracking entities 24 may be configured to identify the individual sessions of consumptions within the plurality of audience device identifiers, e.g. by determining the start of an individual session when a given audience device identifier of an audience device is received for a first time (e.g. for a first time after a session timeout) and by determining the end of the individual session when determining a session timeout, i.e. after receiving the audience device identifier at least once and waiting for a pre-defined timespan without receiving it again. The one or more session tracking entities 24 are configured to provide preliminary information related to the durations of the individual sessions to a data storage entity 26. For example, the preliminary information related to the durations of the individual sessions may comprise at least one element of the group of the durations of the individual sessions, the start of the individual sessions, the end of the individual sessions and the audience device identifiers associated with the individual sessions.

The system 20 further comprises at least one data storage entity 26 configured to store information related to the durations of the individual sessions within a database or within a logging system. For example, the data storage entity 26 may be configured to store the information related to the durations of individual sessions together with the audience device identifiers of the individual sessions. Additionally or alternatively, the at least one data storage entity 26 may be configured to store the size of the monitored subset for each point in time (e.g. for each monitored minute of the day) within the databased or within the logging system. The at least one data storage entity 26 may be configured to determine the size of the monitored subset for each point in time based on the durations (e.g. the start and the end) of the individual sessions.

In at least some examples, the one or more receiving entities 22, the one or more session tracking entities 24 and/or the at least one data storage entity 26 may (each) comprise at least one interface (which may be implemented similar to the at least one interface 12) configured to communicate with the other entities of the systems and/or with the monitored audience devices, and a control module (which may be implemented similar to the control module 14) configured to provide the functionality of the respective entities. In at least some examples, the one or more receiving entities 22, the one or more session tracking entities 24 and/or the at least one data storage entity 26 may be implemented as network entities (e.g. servers, virtual servers or virtual processing instances) within a network In various examples, the system 20 may further comprise the apparatus 10. The information related to the audience of the audio-visual content program may be based on the information related to the durations of the sessions stored within the database or within the logging system. The control module 14 may be configured to determine the information related to the audience based on the information related to the durations of the sessions stored within the database or within the logging system.

At least some examples relate to an approach that may allow to approximate real TV audience reaches and target group shares of broadcast channels based on collected watching behavior of a non-representative sub-set (e.g. of the monitored subset) of the total TV audience. In the following, exemplary embodiments of the above method, apparatus and system are shown. More details and aspects of the above method, apparatus or system are mentioned in connection with the proposed concept or one or more examples described below (e.g. FIGS. 2 to 12). The above method, apparatus or system may comprise one or more additional optional features corresponding to one or more aspects of the proposed concept or to one or more examples described above or below.

Using hybrid TV technologies, in at least some examples, broadcasters may track the presence of a terminal (e.g. an audience device of the monitored subset) on the given channel—and thus in turn at least one viewer who used this terminal to watch this broadcast channel (e.g. the audio-visual content program). While the coverage of hybrid TV technologies might not even be close to 100% in the TV households and, moreover, not every Internet-capable terminal might be connected to the Internet, the broadcaster's measurements may just represent a subset of all reached broadcast receivers.

The audience with an Internet-connected terminal might not be well-selected and, thus, not representative for the total audience. However, in many cases, the numbers of the hybrid TV usage may be higher than those of the conventional representative audience subset. That is why these numbers may build the basis for at least some examples or embodiments introduced in the following.

In some conventional systems, audience measurements for the TV and broadcast domain may rely on a dedicated panel, installed at a very limited group of households. These households and individual persons in the households may be selected following a statistic pattern to approximate a representative copy of the real TV audience in e.g. a specific country. Based on these limited and approximated figures, the TV audience may be calculated for the whole market and KPIs (Key Performance Indicators) like e.g. net reach or gross reach may be declared for a TV channel. This may happen based on collected and extrapolated data earliest the day after the program has been aired. The audience data of some systems may be historical data without immediate benefits for the live TV programming. Furthermore, the total number of panel members may be significantly too low to guarantee approximated reach figures, that are valid for especially smaller channels with less viewers. Taking into account that the whole advertising spending in TV may be based on these approximated figures, smaller TV channels may be disproportionately disadvantaged. Thus, their business model and commercial foundation may be somehow jeopardized by the established system.

At least some examples may provide the required real-time data and in addition predictive data about the live TV audience to immediately adjust and modify the TV programming. Based on the actual TV audience on a specific channel, the broadcaster/channel operator may be able to tailor the upcoming content (e.g. the at least one audio-visual content program element) or advertisements (e.g. the at least one advertising element) to the specific audience and or target groups watching the channel right now. Thus, the advertiser or content owner may be able to reach his specific target group in a highly efficient and dynamic way, instead of buying a planned ad pod or placement opportunity way before the content offering this ad pod or placement opportunity is aired.

Various examples may provide TV Data Aggregation on real TV Audience Subsets. In at least some embodiments, TV audience data may be collected e.g. through an internet based browser environment on connected TV sets, e.g. following the HbbTV standard. A link to a specific tracking software may be provided to the TV set via the broadcast stream (e.g. via the Application Information Table (AIT) of an MPEG (Motion Picture Expert Group) Transport Stream) and may allow the TV set to load the tracking software or script from the provided URL (Uniform Resource Locator) within the browser based application environment coupled to the broadcast stream. In contrast to some web tracking examples, IP (Internet Protocol) enabled audience tracking may follow a special paradigm. A single server call, for instance, might (only) indicate the point in time, when a viewer watches a broadcast channel (e.g. the audio-visual content program). The client, in turn, might not know anything about the displayed content. This information may be enriched on the server-side. Moreover, the TV client might need to call the webserver in regular intervals in order to tell the system, that the current viewing session is still alive (and the viewer still watches that channel). A so-called heartbeat-call (e.g. comprising the information related to the audience device identifier) may be sent in small regular intervals (e.g. periodically), such as one to ten seconds. The client-side script (which may be comprised in the additional information), which may be initially loaded when switching on the broadcast-channel, may load a tracking pixel which might not be visible to the audience but may transmit information to the tracking server. As regular TV sets might not have a unique identifier (e.g. the audience device identifier), which can be used for the identification of a device, a server-generated identifier may be stored in the local storage/cookie of the TV sets. (Each) loading of a tracking pixel may also comprise the generated identifier to allow a persistent identification of a device, even after zapping through other channels, switching of the TV set or unplugging it from power.

On a server, the data (e.g. the information related to the audience) may be aggregated to show the same results as known from traditional panel analytics systems. That means, different values may be calculated which present the measured reach in different ways. Net reach may follow special rules and may represent the amount of active viewers for a given time period (e.g., today between 1 pm and 2 pm). However, the net reach of another period (e.g., 1 pm and 3 pm) might not simply be the sum of two single periods (1 pm to 2 pm and 2 pm to 3 pm), as some viewers might have been active during the whole period and, thus, might be counted (only) once (while the sum of both period reaches might count them twice). Therefore, each presented measurement value may be calculated by taking the actual view sessions into account. Intermediate results, in contrast, may lead to wrong measurement values. Values of interest may be net reach, gross reach (Gross Rating Point (GRP) research and GRP sessions), cumulated reach, return rates (Opportunity To See, OTS), residence time (VWD), gained viewers and lost viewers.

Data Definition

In order to have a common understanding of the method, important terms for the understanding of this approach may be introduced in the following.

FIG. 2a shows a table of a data stat for the prediction of audience rates. The table comprises the columns time 202, Panel-Net Reach 204, Panel-Absolute 206, HbbTV-Absolute 208, Conversion Factor-HbbTV 210, Week of the Year 212, Day of the Week 214, Time of Day (in Minutes, counted from 3 am) 216, Holiday 218, Next Day Free 220, Program Type 222, Program Start 224, Program End 226, Program Duration 228, Program Title 230, Program Subtitle 232, Program Rate 234, Program Part 236, Program Episode 238, Weather Temperature 240, Weather Sun 242 and Weather Rain 244. The panels may comprise information related to at least one context parameter, e.g. may be used as context parameters. The table may comprise information for at least a subset of the columns in one-minute intervals (e.g. 6 months of past data). The table of FIG. 2a may comprise HbbTV and Panel training data, and may comprise conversion factors for prediction, time values, program values and weather values.

Audience Input Data

The basis of at least some embodiments may be a collection of user- and broadcast-specific session-information (e.g. the information related to the audience device identifier) on Internet-connected TV (e.g. the audience devices) sets (e.g. in the broadcast-related HbbTV environment). The amount of active user-broadcast sessions for each point in time may build the required net reach as input data. Each single user of the audience may be identified by the browser's local storage or a cookie (e.g. comprising an audience device identifier) on an Internet-connected TV set (e.g. the information related to the audience device identifier). This enables allocating the user's watching behavior to a user profile on a webserver.

Context Features

In at least some examples, metadata on contexts (e.g. the at least one context parameter) that significantly influence the total audience reach may be required. Context parameters may, amongst others, comprise descriptive metadata on the broadcasted programs for the given point in time (features such as keywords, information on genre, participants, production country and year as well as target group data). Additionally, the at least one context parameter may comprise weather information (e.g. information related to weather conditions) of the end users' region for the given point in time (features such as temperature, rainfall and sky cover). The information related to weather conditions may comprise information related to at least one element of the group of a temperature, hours of sunshine and an amount of precipitation. Moreover, further context information may be extracted from the collected net reach, in terms of temporal trends and recurrences (time of the day, time of the week, time of the year) as well as the net reach itself. However, context parameters may (also) comprise information on competing programs on other channels or non-TV events.

Target, Training and Validation Data

In order to train expected audience rates and validate the system with accuracy/error measurements, existing and approved target data on the total audience rate may be required. This data may build the target values of the system. Therefore, the target data set may be divided into a training data subset and a disjoint validation data subset.

Pre-Requisites

Audience input data, training data as well as validation data (e.g. the information related to the audience and/or the information related to the audience device identifier) may be normalized, in terms of containing the same type of information at the same point in time. A normalized data tuple may be represented by a channel-time-pair—with information on time and channel in order to identify this point. That means for instance, at a particular point in time, the audience input data may have information on the net reach for a specific broadcast channel in a measurement interval of one second. At the same point in time, the target data set (e.g. the information related to the audience) may comprise information on the net reach of the same broadcast channel and for the same interval range. Moreover, a channel-time-pair may comprise a set of individual users/terminals who are actively watching this broadcast channel at the given point in time. This may be represented by a channel-time-user-triplet. Context features may be normalized for comparison reasons as well in order to related a set of context features with each channel-time-pair and with each channel-time-user-triplet.

Method: Panel Predictor

The method may comprise (at least) three steps, while step one is the basis for step two and three, step two and step three may be applied independently. Afterwards, the mined audience shares may be processed in order to improve the program (programming), classify advertisement rates and select appropriate advertisements.

FIG. 2b shows a block diagram of (steps performed by) a Panel Predictor according to an embodiment. The Panel Predictor 250 may be configured to obtain information related to a measured audience 252 and information related to additional data 254, and to provide information related to an audience reach (net reach, gross reach) 256, information related to traditional target groups/share 258 and information related to custom target groups/share 260. In post-processing 262, based on the information provided by the panel predictor 250, dynamic program planning/plan optimization 264, automatic classification of advertisement rates 266 and personalized ad delivery/replacement 268 may be performed.

Step One: Approximation of TV Audience Rates Via the Prediction of Conversion Factors The system may detect the conversion factors (e.g. the at least one conversion factor) for each net reach of a channel-time-pair of the input data and the corresponding channel-time-pair of the training data. Correlations and dependencies between past conversion factors and a set of context features (e.g. the at least one context parameter) may be determined and trained for future predictions by a supervised learning algorithm. Correlating context features may be presented to TV researchers in order to manually optimize further programs.

Figures 1, 13:
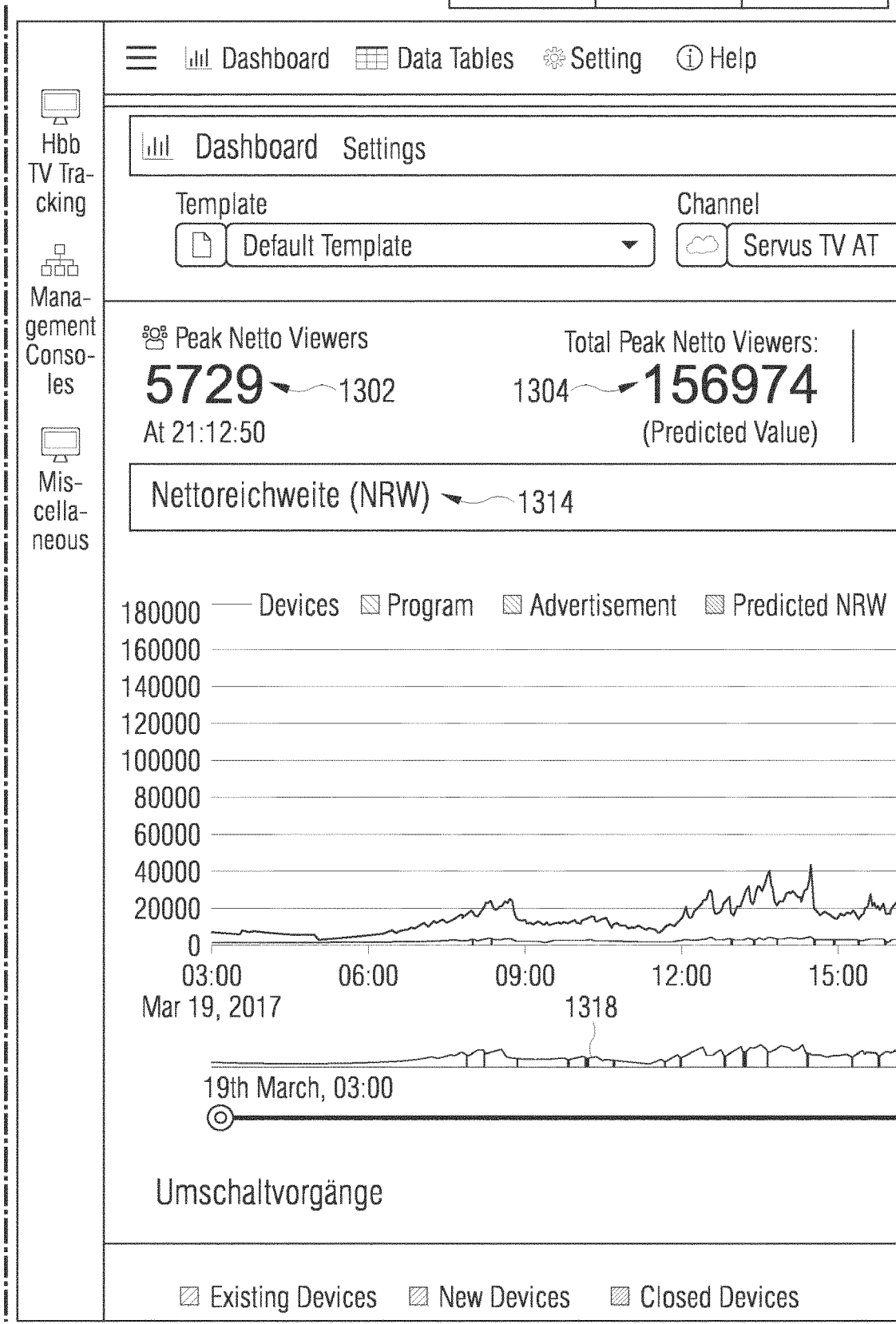
FIG. 13 shows an interface presenting information related to the subset of the audience and predicted information related to the total audience.
Figures 2, 13:
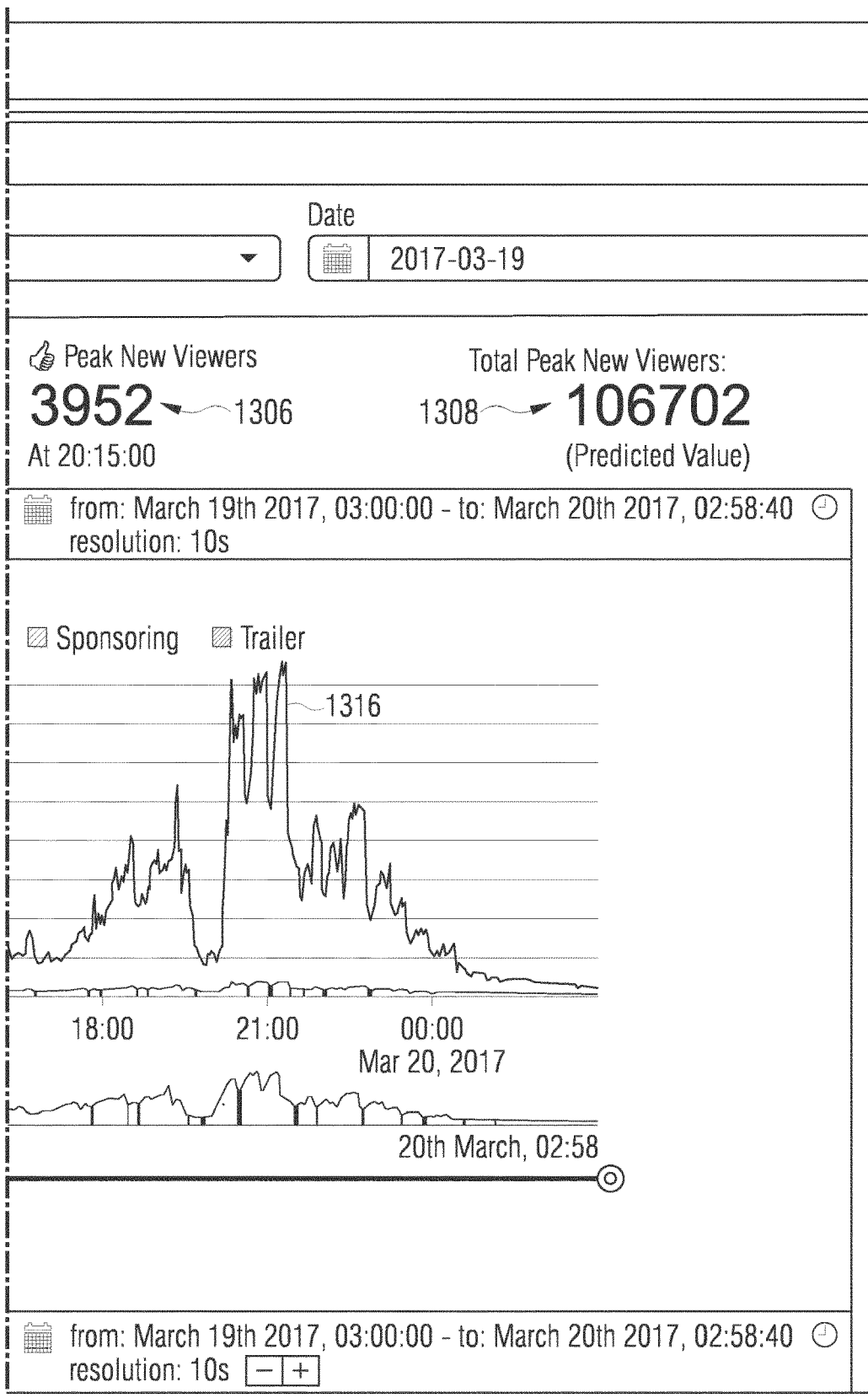
Figures 3, 13:
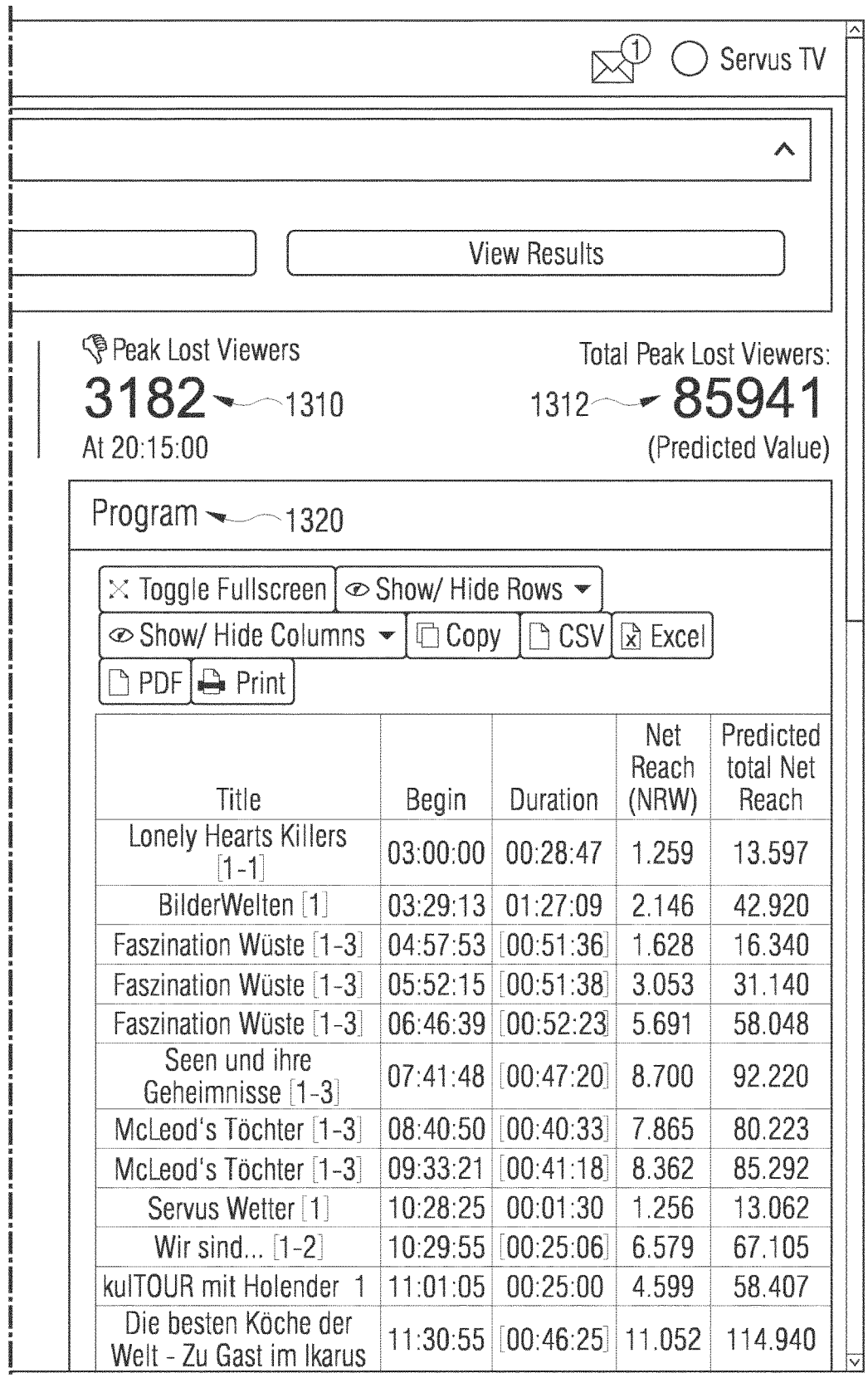
FIG. 3 shows an example of time-variant conversion factors from HbbTV audience to total audience reach for—at the point in time of diagram creation—past and future points in time.

FIG. 3 shows an example of a set of conversion factors from HbbTV audience to total audience reach. FIG. 3 302 shows the absolute number of HbbTV devices (e.g. audience devices of the monitored subset), 304 shows the total audience according to the panel and 308 a calculated conversion factor between the absolute number of HbbTV devices 302 and the total audience according to the panel. 306 shows the (approximated) total audience, which may be predicted based on the absolute number of HbbTV devices 302 and a predicted conversion factor 310. The conversion factor 310 may reflect the ratio between the predicted (total) audience rate (size) 306 and the absolute number of HbbTV devices 302 (e.g. of the monitored subset), and may be based on context parameters (not shown here).

The algorithm, in turn, may predict conversion rates for a set of context features—even and especially for unknown accepted real audience rates of the input channel-time-pairs. As intermediate result, predicted conversion factors (e.g. 308) may be multiplied with the measured net reach (e.g. 304) of the input channel-time-pairs. The result may be an approximated net reach (e.g. 302). In the training and validation phase, a random training set may be used to learn conversion factors. In a cross-validation step, deviation and error values may be calculated by comparing the predicted net reach of the channel-time-pair of the input data and the channel-time-pair of the validation data.

FIG. 4 shows conversion factors over a sample day (Mar. 13, 2017) for converting between a net reach of a panel and a net reach of HbbTV. FIG. 4 402 shows a progress of the conversion factor over the day, from 3 am on Mar. 13, 2017, to 2:59 am on Mar. 14, 2016, and ranges 404-412, within which the conversion factors were located. The solid bar of ranges 404-412 denotes a range comprising 50% of all conversion factors, and the lines located above and below the solid bars each comprise the lower/upper 25% of conversion factors. Range 404 illustrate the conversion factors over the whole day, range 406 illustrates the conversion factors from 3 am to 10 a, range 408 illustrates the conversion factors from 10 am to 0 pm, range 410 illustrates the conversion factors from 6 pm to 8 pm and range 412 illustrates the conversion factors from 8 pm to 11 pm.

In addition to the approximation of net reaches for past TV consumption, at least some examples enable predicting future net reaches by taking (all) available data features into account. Real consumption data may be missing, such as panel or HbbTV data. However, incorporating the context features (e.g. the at least one context parameter) may allow to predict future net reaches (for instance by training a Deep Learning/artificial neural network algorithm). As most features might only be available for the past, a future prediction may be less accurate, but still indicative for further analysis.

Step Two: Classification of Known Target Groups

A target group may be a subset of users from the total audience. Known target groups (e.g. the plurality of pre-determined target groups) may be differentiated by the set of their features, e.g. gender, age, job/affiliation, level of education etc. Based on step one, at least some examples may additionally create artificial users, so-called personas, who represent (all) users of a particular target group of the training data. Thus, a persona may represent the average feature vector of (all) users in this target group and might be seen as stereotype.

The target group's watching data, in turn, may be a list of the channel-time-pairs for the given target group. For instance, the net reach in the target group's watching data, might comprise (just) the target group's subset of the total measured net reach.

The system (e.g. the method) may process the target group's watching data of the training data in order to train a supervised learning algorithm. The features of that algorithm may be (all) context features of the channel-time-pairs. The system may identify significant context features per persona (e.g. the custom target groups of similar users) in a training and validation phase.

In a prediction phase, the system may classify the users of the input data set by the target group class of the closest persona. The closest persona may show the lowest distance in its feature vector to the given user. The watching behavior of un-classified users of the input data may therefore be matched with these personas in order to give the former an appropriate target group label.

Based on this classification step, the net reach of each class may be approximated separately by applying step one for each target group user subset.

FIG. 5 shows a clustering of traditional target groups by the audience member's behavior. FIG. 5 502a shows the target group 502a of persona 1, aged 20-30, male, watching sport, sport, documentaries, sport, sport movies and action movies, the target group 504a of persona 2, aged 30-40, female, watching news, documentaries, documentaries, documentaries, weather, and action movies, the target group 506a of persona 3, aged 14-20, watching documentaries, sport movies, action movies and child programs, and the target group 508a of persona 4, aged 50+, male, watching documentaries and news. On the left side, the shares of the personas among the (traditional) panel are shown, on the right, the respective shares among the viewers of HbbTV are shown (where persona 1 is overrepresented). When re-applying step one for only one target group, the overrepresentation within the subset may be compensated for and the real amount may be estimated/predicted in the total set, e.g. instead of having disproportionate number of men between 20 and 30, a more plausible/representative number may be calculated.

Step Three: Classification of Unknown Target Groups

Based on step one and additionally to step two, in at least some examples, the system (e.g. the method) may use an unsupervised classification algorithm (clustering) in order to identify (new) groups of similar users in the input data. The algorithm may compare (just) the feature vectors (e.g. the at least one context parameter) of the channel-time-user-triplets of the input data without any preprocessing. The resulting clustered user groups may represent custom target groups with only some significant features. This step might not require any training or validation data, as (only) patterns in the input data might be identified. The goal may be to identify custom target groups based on their viewing behavior. This step may ignore established target groups (e.g. the plurality of pre-determined target groups) as intermediate result. Examples may use top down clustering (expect K clusters) with all given features to identify the new groups of similar users (e.g. the custom target groups). A manual identification of custom labels may be performed. Examples may use K-Means/X-Means Clustering with random center points and/or Deep Learning (artificial neural networks).

Figure 6:
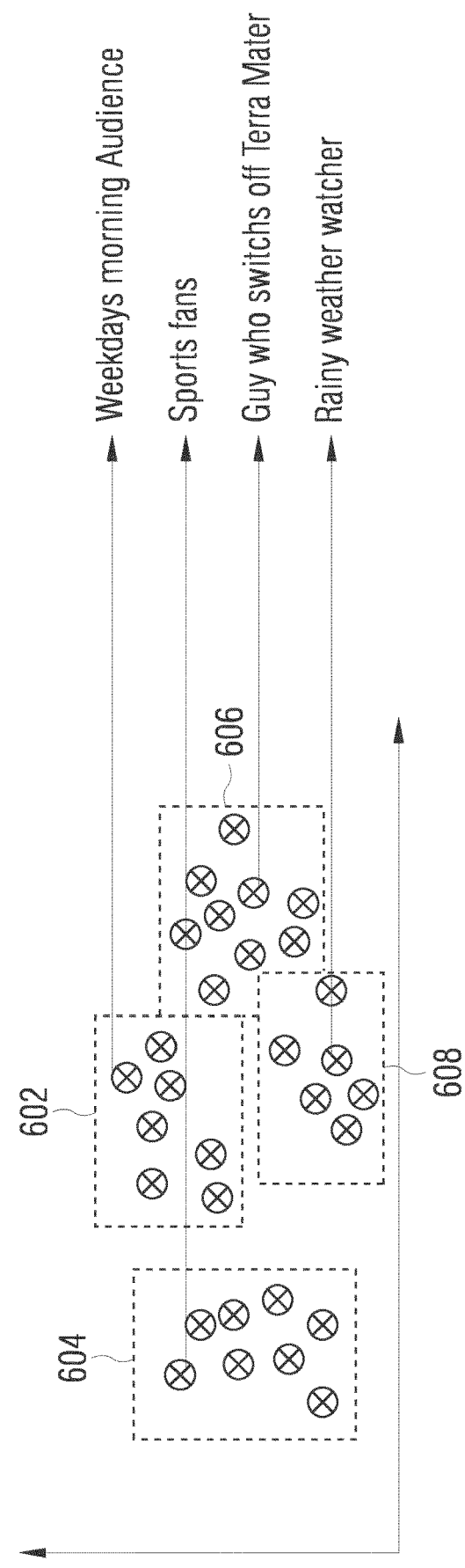
FIG. 6 illustrates a determination of target groups based on a classification of behavior.

Based on this classification step, the net reach of each target group class may be approximated separately by applying step one for each target group user subset. FIG. 6 illustrates a classification of behavior target groups. FIG. 6 602 shows the "weekdays morning audience" target group, 604 shows the "sports fans" target group, 606 shows the "guy who switches off Terra Mater" target group and 608 shows the rainy weather watcher target group.

Feasibility

A statistical analysis may show that the underlying conversion factor is in a reasonable range between ca. 3 and ca. 8 (ca. 5 in average) with (only) few (but extreme) exceptions. For some examples, the analysis may indicate the following:

Conversion factors should be at least 1, as HbbTV viewers might also be valid total users and, thus, HbbTV audience might not be less than the total audience Law of large numbers: The approach may work better for bigger net reaches; thus, small Panel viewer numbers may be avoided for training (an according threshold can be identified with machine learning; a first implementation of a decision tree suggests an initial threshold of about 1600 viewers)

Conversion Factor might not change dramatically in short time, because the audience composition might only change slowly, as well As Machine Learning may include also contextual information, it may result in better approximations than simple statistical methods (e.g. average conversion etc.)

FIG. 7 shows a total range of conversion factors analyzed within 6 months. FIG. 7 702 shows conversion factors 0 to 20 (comprising the 50% range solid bar), and 704 shows the entire range of conversion factors 0 to 100, showing more extreme exceptions.

Both, the model of a decision tree as well as the model of an artificial neural network may be trained in order to predict new conversion factors for before unknown points in time. Thereby, the decision tree may be better readable for humans (the role and distinction of features is understandable) but the artificial neural network may reach better results in terms of lower averaged error values.

FIG. 8 shows a model of a decision tree for predicting conversion factors in machine learning (on the left), and a Mean Absolute Error (MAE) and Root Mean Square Error (RMSE) for the trained decision tree (on the right). The model of the decision tree comprises input dataset 802, select columns (select necessary columns) in dataset 804, edit metadata (select label) 806, edit metadata (select features) 808, boosted decision tree regression 803, cross validate model 810, train model 812, export data 814 and score model 816. The corresponding table for the MAE and the RMSE show the fold number 818, the number of examples in fold 820, the model 822, the MAE 824, the RMSE 826 and the Relative Absolute Error (RAE) 828 of the predicted conversion factors.

Figures 2, 9:
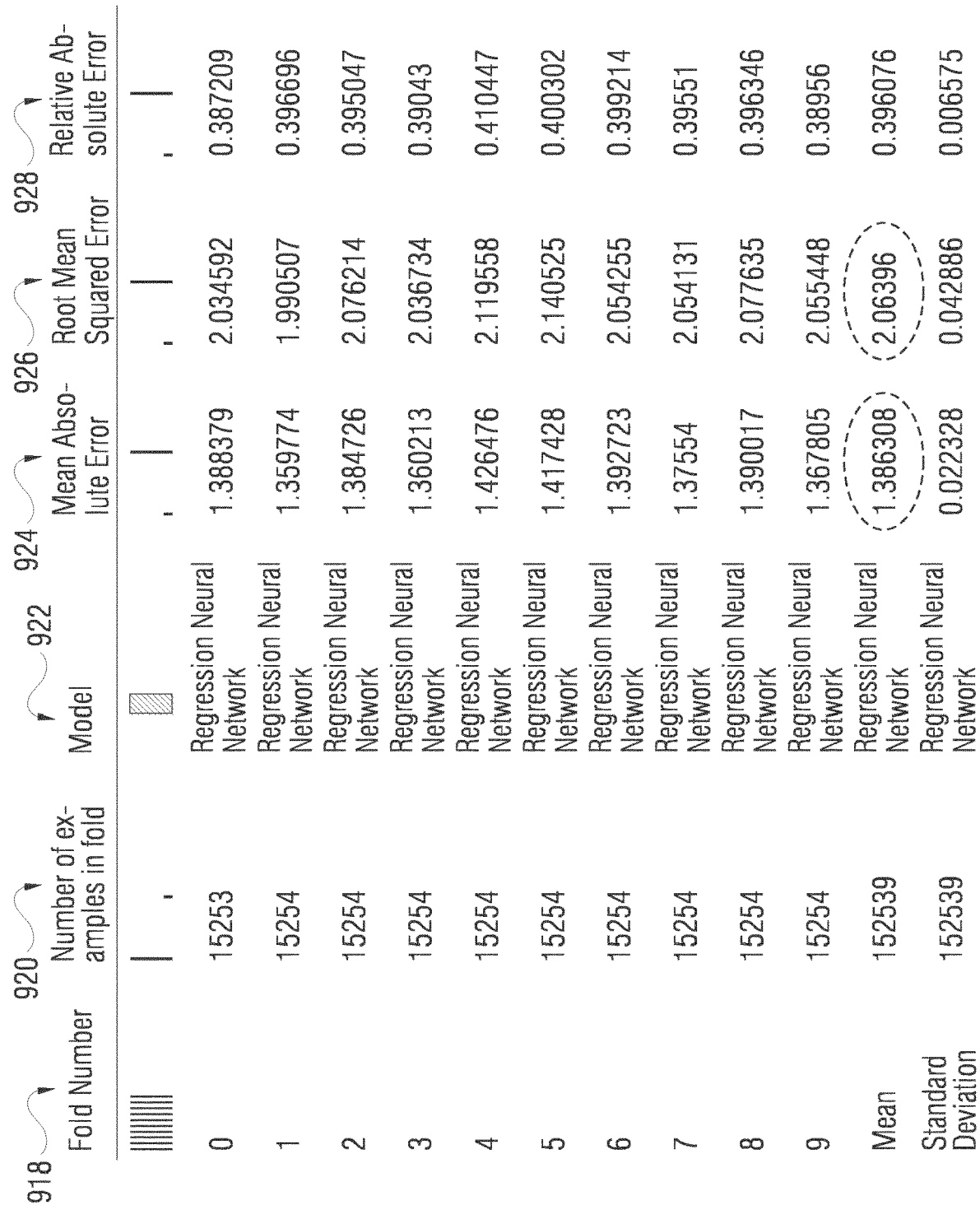
FIG. 9 shows a model of a neural network and a mean absolute error and a root mean square arrow of a trained neural network of an example.

FIG. 9 shows a model or an artificial neural network for predicting conversion factors in machine learning (on the left) and a MAE and RMSE for the trained neural network (on the right). The model of the neural network comprises the input dataset 902, select columns in dataset 904, split data 906, neural network regression 908, train model 910 and cross validate model 912. The corresponding table for the MAE and the RMSE show the fold number 918, the number of examples in fold 920, the model 922, the MAE 924, the RMSE 926 and the Relative Absolute Error (RAE) 928 of the predicted conversion factors.

In an example, Microsoft Excel, Microsoft Azure Machine Learning and Rapid Miner were used for performing the machine learning.

This can be seen as feasibility study in order to show the expected success. Further improvement of the model and extraction of well-defined features will improve the results.
Utilization of the Method The method according to at least some examples may aim at developing a more accurate alternative to the actual hired representative participants set, which may be cost-intensive and which may bear the risk of being inaccurate—especially for lower audience rates.

This approach may be designed to fit the needs of broadcasters for analyzing their TV audience rates, understand the behavior of their total audience as well as of user subsets and target groups. Moreover, the mined data may be used for further program optimization and even program personalization for individual users. Third party service providers, such as advertisers, may receive the predicted target group data in order to present appropriate/personalized commercials.
Selection of Appropriate Programs and Advertisements A subsequent technical process may be established to improve the TV programming and dynamic ad-decisioning based on the real-time audience data, real-time target-groups and predicted audience data resulting from the above mentioned previous steps. Other audience measurements for the TV and broadcast domain may rely on a dedicated panel, installed at a very limited group of households. These households and individual persons in the households may have been selected following a statistic pattern to approximate a representative copy of the real TV audience in e.g. a specific country. Based on this limited and approximated figures the TV audience may be calculated for the whole market and KPIs (Key Performance Indicators) like e.g. net reach or gross reach may be declared for a TV channel. This may happen based on collected and extrapolated data earliest the day after the program has been aired. In fact, the audience data may be historical data without immediate benefits for the live TV programming.

At least some examples may provide the required real-time data and in addition predictive data about the live TV audience to immediately adjust and modify the TV programming. Based on the actual TV audience on a specific channel, the broadcaster/channel operator may be able to tailor the upcoming content and or advertisements to the specific audience and or target groups watching the channel right now. Thus, the advertiser or content owner may be able to reach his specific target group in a highly efficient and dynamic way, instead of buying a planned ad pod or placement opportunity way before the content offering this ad pod or placement opportunity is aired.

This may introduce new business models to sell advertisements and to program a channel in (linear) TV:

Dynamic ad insertion (and e.g. delivering via the bi-direction channel) through real time bidding Dynamic ad insertion for upcoming placement opportunities through pre-auctioning mechanisms based on predicted audience data Dynamic channel programming based on real time audience data Dynamic channel programming based on predicted reach Establishment of a new content and advertisement currency (e.g. oriented on real and individual target groups instead of CPM (cost per thousand impressions)

The system may be implemented in at least two ways:
One-to-Many Approach

Step one may implement the above-mentioned mechanism to introduce dynamic ad and content decisioning at the program playout. Ads (e.g. the at least one advertising element) and content (e.g. the at least one audio-visual content program element) may be ingested in the broadcast stream based on real-time and/or predicted audience data to realize targeting at the playout. This is the one-to-many approach with dynamic content and ad insertion.

Figure 10:
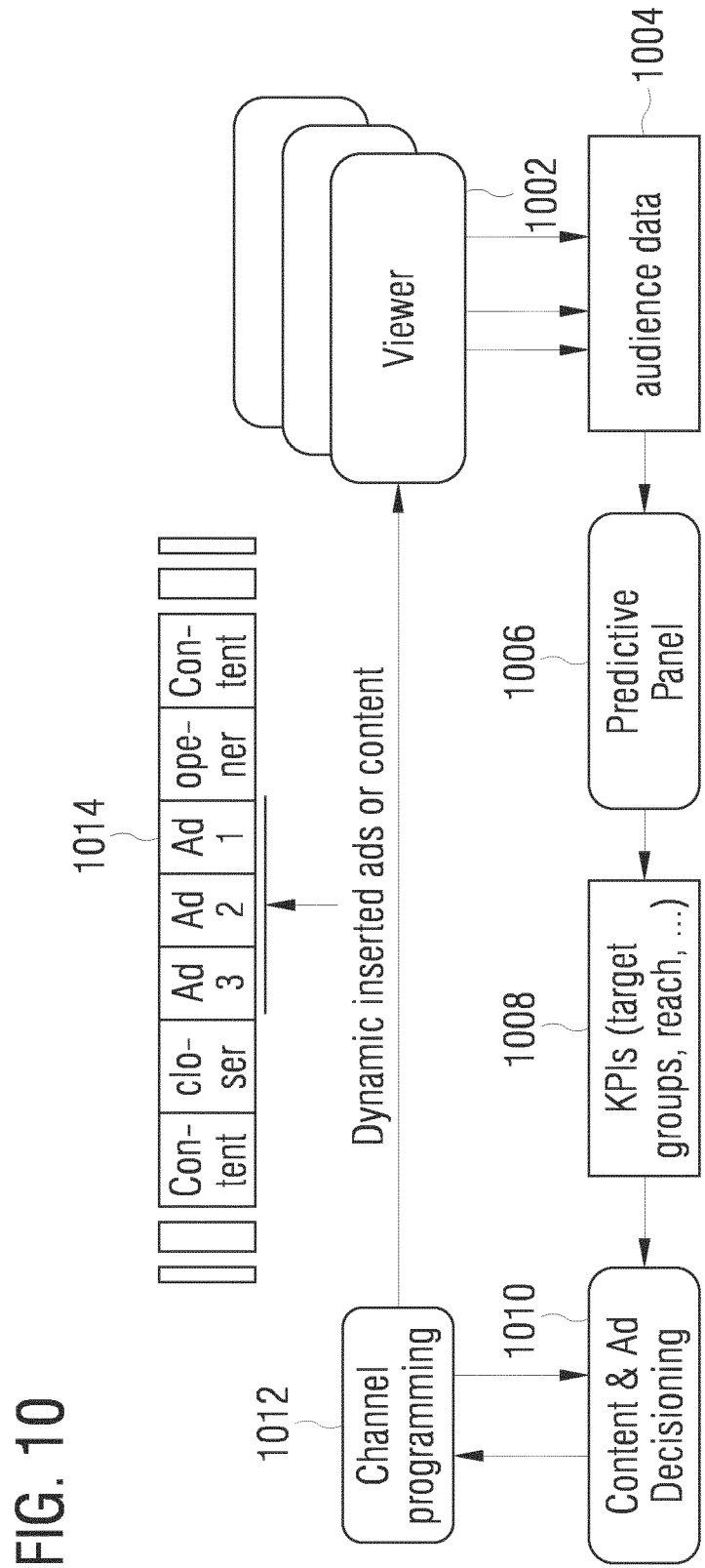
FIG. 10 illustrates "one-to-many" dynamic content insertion based on predicted audience data.

FIG. 10 shows the "One-to-many" dynamic content insertion based on predicted audience data. The viewers 1002 (e.g. the subset of the audience) may provide audience data 1004 (e.g. the audience device identifiers) to the predictive panel 1006 (e.g. to determine the information related to the audience), to obtain KPIs (target groups, reach, . . . ) 1008, decide on the content and ads 1010, and perform the channel programming 1012. The ads/content (e.g. the program element/advertising element) may be dynamically inserted 1014 within the audio-visual content program.

This may be a preferred approach to start from today and integrate with broadcasters and cable operators utilizing the established infrastructure and device population, as integration may be required on playout side only.
One-to-One Approach Step 2 may take advantage of client-side content and ad insertion techniques based on client/terminal capabilities to seamlessly overlay, replace or stitch individual content or ads into a linear stream based on real-time or predicted audience data. This may compare to a one-to-one (individual, per client) approach.

Figure 11:
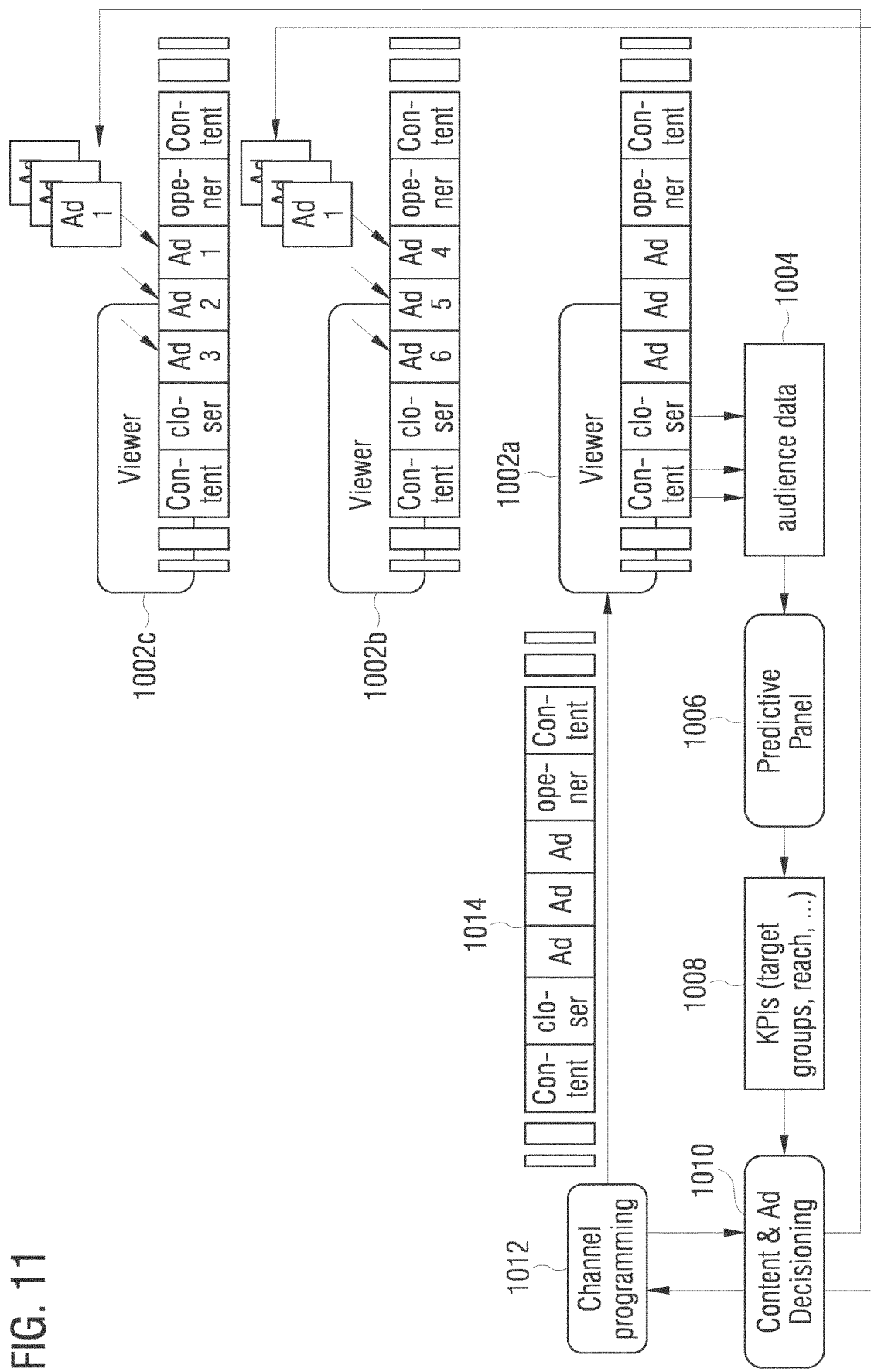
FIG. 11 illustrates individual "one-to-one" dynamic content insertion based on predicted audience data.

FIG. 11 shows individual "one-to-one" dynamic content insertion based on predicted audience data. The block diagram of FIG. 11 may be similar to the block diagram of FIG.

10, except for the content & ad decisioning 1010, which may provide individual advertising to the viewers 1002a; b and c, instead of dynamically inserting 1014 the advertising into the audio-visual content program received by all viewers 1002. This approach might require special device capabilities as e.g. frame-accurate content stitching, multiple video elements or enhanced video/content overlay techniques, but does enable real-time one-to-one individualized targeting.

Dynamic Program Planning Based on Real-Time Audience Feedback

Based on real time audience data and audience reach predictions following the methods described above, the system (e.g. the method) may be utilized to dynamically adjust and re-plan the TV programming (e.g. by selecting an audio-visual content program element) of a specific or multiple channels (audio-visual content programs). Thus, the broadcaster may be able to increase effectiveness of his program immediately by following his audience in a dynamic manner. Producers and program planners may benefit from real time performance indicators reflecting the success of their program in any specific point of time and for real target groups. In addition to a simple targeted or personalized content selection, it may be also possible to select the type of content, such as advertisements or shows, based on the approximated reaches and target group shares. Thus, during a commercial break, the real time measurements may recommend to play another advertisement spot or stop the commercial break and resume to the actual broadcast show. By identifying thresholds, such as a loss of 30% audience during the commercials compared to the before played program, the schedule in the playout system might be dynamically updated with real-time feedback, e.g. to trigger selecting 140 the at least one audio-visual content program element/selecting 150 the at least one advertising element. As a consequence, the system can improve advertisement periods and reduce the amount of lost viewers.

Examples further provide an analytics toolkit. The analytics toolkit may provide means to derive various TV-research facts (e.g. properties of the audio-visual content program) based on the usage data measured by the HbbTV-Tracking. Following TV-research habits, these facts (properties) may be calculated based on the following specification.

Data Basis/Tracking Data

The HbbTV tracking may provide session data for individual devices (e.g. as the information related to the audience). A session may comprise or consist of a channel identification, a device identification and a beginning and an ending timestamp. From these, five raw-facts may be derived:

- Number of visits (i.e. session count) within a given time-frame (plus additional constraints)
- Number of visitors (i.e. unique devices) within a given time-frame (plus additional constraints)
- Accumulated average session duration of the visitors (i.e. unique devices) within a given time-frame (plus additional constraints)
- Number of visitors (i.e. unique devices) arriving at a channel within a given time-frame (plus additional constraints)
- Number of visitors (i.e. unique devices) leaving a channel within a given time-frame (plus additional constraints)

The "additional constraints" may cover optional further refinements of the evaluated target group. These may comprise:

Viewer definition
  (Only) Sessions of those devices may be regarded, that
    Have a visit duration (either consecutive or not) within a specified time window, e.g. min 10 seconds, max: infinite
    Have (or have not) a session within the regarded time-frame that is not the first session of the device ("returning visitor")
Target group
  (Only) devices comprised in a set of devices defined from a previous report might be regarded Data Tables/Report Structure Generally, the report generated by the toolkit may have a tabular structure with a hierarchical organization of rows and columns. At the inner rows hierarchy level, one table line may represent, for each column, a "single value"; this may be the basic data granularity of the report. At each higher row hierarchy level, "aggregate values" ("totals") may be calculated, according to the facts specific aggregate function. Thus, each fact may be specified by its "single value"- and its "aggregate"-function, Facts (e.g. properties of the audio-visual content program, may be comprised within the information related to the audience)

Net Reach

Number of visitors within a given period. Basis for single values might be at most the TV day. May be a single value of the number of visitors within the rows period or an aggregate value with an average for the current row level over the innermost row level (single values).

Cumulated Reach

Number of visitors within a given period. May be a single value of number of visitors within the time frame from the beginning of the current inner row levels time frame up to the current (inner) rows period of time or an aggregate value. On each upper row level, the cumulated reach may represent the number of unique visitors within this levels rows time frame. In contrast to the NRW, this may exceed the TV day bounds.

Gross Rating Points—Research (GRP-Research)

Cumulated number of visitors per unit of the report granularity, i.e. the innermost rows levels. May be a single value of the sum of the number of visitors (net reach) up from the beginning of the current inner row levels time frame up to the current (inner) rows period of time or an aggregate value of the sum over the innermost row levels net reach for the current row levels time frame.

Gross Rating Points—Session (GRP-Session)—Short Gross Reach

Number of visits within a given period. May be a single value of the number of visits with the rows period or an aggregate value of the sum over the next inner level (single or aggregate).

Opportunity to See/Return Rate (OTS)

This fact (property) is, for single values as well as for aggregates, defined as the quotient of GRP-Research divided by the respective cumulated reach.

Residence Time

Average duration of all visits within a given period. Basis for single values might be at most the TV day. May be a single value of an average of the per-device accumulated session durations within the rows period or an aggregate value of an average for the current row level over the innermost row level (single values) (Like NRW).

Gained/Lost Viewers

Number of devices that arrived at/left the channel within a given period. Basis for single values might be at most the TV day. May be a single value of the number of devices that arrived at/left the channel within the rows period or an aggregate value of an average for the current row level over the innermost row level (single values) (Like NRW).

FIG. 13 shows a user interface for an exemplary report, giving an overview over an entire day for an audio-visual content program. FIG. 13 1302 shows the peak net viewers (of the monitored subset) and 1304 shows the predicted total peak net viewers for the entire audience, 1306 shows the peak new viewers (of the monitored subset) and 1308 shows the predicted total peak new viewers for the entire audience, 1310 shows the peak lost viewers (of the monitored subset) and 1312 shows the predicted total peak lost viewers for the entire audience. In section 1314, the net reach is shown. FIG. 13 1316 shows the predicted net reach for the entire audience, which is based on the number of devices 1318 (of the monitored subset) as shown below graph 1316. Graph 1318 shows a preview of the number of devices of the monitored subset. Below the preview of the number of devices 1318, the type of audio-visual content, e.g. program, advertisement, sponsoring or trailers is shown, which may illustrate an influence of advertisements on the number of devices. In FIG. 13 1320, statistics for different audio-visual content program elements are shown, e.g. a measured net reach (of the monitored subset) and a predicted total net reach.

Examples further provide a method to determine information on an audience (e.g. the information related to the audience) of a broadcast program (e.g. the audio-visual content program). The method comprises monitoring a subset of the audience. The method further comprises determining the information on the audience based on the monitored subset of the audience and on at least one context parameter indicating a property of the broadcast program.

In some examples, the method may further comprise determining a conversion factor based on the at least one context parameter and scaling a number of members of the monitored subset using the scaling parameter (e.g. estimating the total size of the audience).

In some examples, the method may further comprise determining at least one personal context parameter for at least one member of the subset of the audience. The method may further comprise attributing the member to one of a plurality of target groups based on the determined personal context parameter.

In various examples, the method may further comprise determining a plurality of personal context parameters for a plurality of members of the subset of the audience and defining at least one target group based on the plurality of personal context parameters.

In at least some examples, the at least one context parameter may be one of a metadata on the broadcast program, information on a weather condition at the time of the broadcast, information on the time of the broadcast, or information on simultaneously broadcast further programs.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for the real-time adjustment of an audio-visual content program by determining information related to an audience of the audio-visual content program provided in a broadcast over a first, unidirectional network, the method comprising:
    determining an at least one context parameter related to the audio-visual content program;
    monitoring at least a subset of the audience during the broadcast, wherein:
        each member of the subset has an audience device connected to a second network, and
        the monitoring of each member of the subset comprises:
            assigning an audience device identifier to the audience device, and
            periodically determining the audience device identifier from the audience device via a transmission over the second network;
    determining at least one conversion factor based on a relationship between a property value measured within at least one previously monitored audience subset and the corresponding property value of the previous audience,
        wherein the at least one conversion factor indicates a relationship between a property measured within the monitored subset of the audience and at least one property of the audience;
    determining the information related to the audience based on the monitored subset of the audience by aggregating the periodic determinations of the audience device identifier for a given member of the subset of the audience with the at least one context parameter,
        wherein the information related to the audience comprises measured metrics for the subset of the audience;
    estimating at least one property of the audience based on the at least one conversion factor and based on the information related to the audience that is determined based on the subset of the audience, and
    adjusting the audio-visual content program based on the at least one property of the audience.

2. The method according to claim 1, wherein the at least one context parameter indicates a property of the audio-visual content program or conditions at a time the audio-visual content program is presented.

3. The method according to claim 2,
    wherein the at least one conversion factor is determined based on information related to at least one previous audience and/or based on the at least one context parameter,
    and/or wherein the at least one property of the audience comprises at least one element of the group of a total size of the audience, an average viewing duration, a number of returning viewers, a number of gained viewers, and a number of lost viewers,
    and/or wherein the at least one conversion factor is determined based on a relationship between a property value measured within at least one previously monitored audience subsets and the corresponding property value of the previous audience,
    and/or wherein the at least one conversion factor is determined using a regression-based analysis,
    and/or wherein the at least one conversion factor is determined using an artificial neural network.

4. The method according to claim 2, wherein the at least one context parameter is based on one or more elements of the group of metadata of the audio-visual content program, information related to external conditions at the time the audio-visual content is presented, information related to weather conditions at the time the audio-visual content is presented, information on the time the audio-visual content is presented, and information related to other audio-visual content programs running at the time the audio-visual content is presented.

5. The method according to claim 1, wherein the at least one context parameter indicates a property of the audio-visual content program and conditions at the time the audio-visual content program is presented.

6. The method according to claim 1
    wherein the monitoring of the subset of the audience further comprises receiving information related to the audience device identifier from monitored audience devices via the second network, wherein the second network is bi-directional,
    and/or wherein the method further comprises providing additional information related to the audio-visual content program to the monitored audience devices via the second, bi-directional network.

7. The method according to claim 6,
    wherein the information related to the audience device identifier is received as part of client requests of the monitored audience devices,
    and/or the method further comprising providing the initially assigned audience device identifiers via the second, bi-directional network to the monitored audience devices for storing on the monitored audience devices,
    and/or wherein the monitoring of the subset of the audience further comprises periodically receiving the information related to the audience device identifier from the monitored audience devices presenting the audio-visual content program received over the first, unidirectional network,
    and/or wherein aggregating the received information related to the audience device identifier for a given audience member of the monitored subset of the audience with the at least one context parameter is done over a plurality of points in time.

8. The method according to claim 1,
    wherein the method further comprises clustering similar audience members of the monitored subset of the audience to determine one or more custom target groups, and/or wherein the method further comprises attributing audience members of the monitored subset to a plurality of predetermined target groups.

9. The method according to claim 1, wherein adjusting the audio-visual content program comprises:
   selecting at least one audio-visual content program element and/or at least one advertising element for the audio-visual content program based on the information related to the audience, and
   delivering, via the second network, the selected at least one audio-visual content program element and/or the at least one advertising element to a subset of the audience or to the entire audience.

10. The method according to claim 9,
   wherein the at least one advertising element and/or the at least one program element is selected for the entire audience of the audio-visual content program,
   or wherein the at least one advertising element and/or the at least one program element is selected for at least one group of members of the audience,
   or wherein the at least one advertising element and/or the at least one program element is selected individually for single members of the audience.

11. The method of claim 9, wherein delivering the selected at least one audio-visual content program element and/or the at least one advertising element comprises overlaying, replacing, or stitching the selected at least one audio-visual content program element and/or the at least one advertising element into the audio-visual content program that is broadcast over the first, unidirectional network.

12. The method of claim 9, wherein monitoring at least the subset of the audience during the broadcast further comprises determining information related to the selected at least one audio-visual content programming element and/or the at least one advertising element delivered to the subset of the audience or to the entire audience.

13. The method according to claim 1 further comprising determining information related to a predicted total size of the audience of the audio-visual content program at a point in time in the future based on the information related to the audience,
   and/or the method further comprising determining information related to a predicted total size of the audience of the audio-visual content program at a point in time in the future based on the information related to the audience and/or based on the at least one context parameter effective at the point in time in the future,
   and/or the method further comprising determining a predicted composition of the audience of the audio-visual content program at a point in time in the future based on the information related to the audience and/or based on the at least one context parameter effective at the point in time in the future,
   and/or the method further comprising determining information related to a predicted advertising value of the point in time in the future based on the predicted information related to the total size of the audience and/or on the predicted composition of the audience at the point in time.

14. The method according to claim 1, wherein the method further comprises providing, via a bi-directional network, at least one element of the group of information related to a predicted total size of the audience, information related to a size of the subset of the audience, information related to a predicted composition of the audience, information related to a composition of the subset of the audience, information related to attributed predetermined target groups, information related to clustered custom target groups and information related to a predicted advertising value.

15. A non-transitory computer-readable medium, storing a program code, wherein the program code performs the method according to claim 1 when the program code is executed on a computer, a processor, or a programmable hardware component.

16. The method of claim 1, wherein adjusting the audio-visual content program further comprises:
   selecting at least one audio-visual content program element and/or at least one advertising element for the audio-visual content program based on the information related to the audience, and
   modifying the audio-visual content program that is broadcast over the first, unidirectional network with the selected at least one audio-visual content program element and/or at least one advertising element.

17. The method of claim 16,
   wherein the at least one advertising element and/or the at least one program element is selected for the entire audience of the audio-visual content program,
   or wherein the at least one advertising element and/or the at least one program element is selected for at least one group of members of the audience,
   or wherein the at least one advertising element and/or the at least one program element is selected individually for single members of the audience.

18. An apparatus for the real-time adjustment of an audio-visual content program by determining information related to an audience of the audio-visual content program provided in a broadcast over a first, unidirectional network, the apparatus comprising:
   at least one interface with a second network configured to receive information related to a subset of the audience of the audio-visual content program during the broadcast; and
   a control module, configured to:
      determine an at least one context parameter related to the audio-visual content program,
      monitor the subset of the audience using the at least one interface,
         wherein each member of the subset of the audience has an audience device; and
         wherein the monitoring of each member of the subset comprises:
            assigning an audience device identifiers to the audience device; and
            periodically determining the audience device identifier from the audience device via a transmission over the second network,
      determine at least one conversion factor based on a relationship between a property value measured within at least one previously monitored audience subset and the corresponding property value of the previous audience,
         wherein the at least one conversion factor indicates a relationship between a property measured within the monitored subset of the audience and at least one property of the audience,
      determine the information related to the audience based on the monitored subset of the audience by aggregating the periodic determinations of the audience device identifier for a given member of the subset of the audience with the at least one context parameter,
         wherein the information related to the audience comprises measured metrics for the subset of the audience, estimate at least one property of the audience based on the at least one conversion factor and based on the information related to the audience that is determined based on the subset of the audience, and adjusting the audio-visual content program based on the at least one property of the audience.

19. A system for periodically receiving information related to an audience device identifier from a monitored subset of an audience of an audio-visual content program provided in a broadcast over a first, unidirectional network,
wherein the system initially assigns and provides a unique audience device identifier to each of a plurality of monitored audience devices of the monitored subset of the audience,
wherein each of the plurality of monitored audience devices sends a periodic activity beacon that periodically transmits the audience device identifier via a second network, the system further comprising:
one or more receiving entities configured to:
extract a plurality of the audience device identifiers of the monitored subset of the audience from a plurality of the periodic activity beacons,
and provide information comprising the plurality of the audience device identifiers to one or more session tracking entities;
one or more session tracking entities, configured to:
determine information related to durations of individual sessions of consumption of the audio-visual content program by the monitored subset of the audience based on the plurality of the audience device identifiers, and
provide preliminary information related to the durations of the individual sessions to a data storage entity;
and at least one data storage entity configured to:
store information related to the durations of the individual sessions within a database or within a logging system.

20. The system according to claim 19 further comprising an apparatus for determining information related to an audience of an audio-visual content program broadcast over the first, unidirectional network, the apparatus comprising:
at least one interface configured to receive information related to a subset of the audience of the audio-visual content program; and
a control module, configured to:
monitor the subset of the audience using the at least one interface, determine at least one conversion factor based on a relationship between a property value measured within at least one previously monitored audience subset and the corresponding property value of the previous audience,
wherein the at least one conversion factor indicates a relationship between a property measured within the monitored subset of the audience and at least one property of the audience,
determine the information related to the audience based on the monitored subset of the audience by aggregating the extracted audience device identifiers for a given member of the subset of the audience with the at least one context parameter,
wherein the information related to the audience comprises measured metrics for the subset of the audience,
estimate at least one property of the audience based on the at least one conversion factor and based on the information related to the audience that is determined based on the subset of the audience,
wherein the information related to the audience of the audio-visual content program is based on the information related to the duration of the sessions stored within the database or within the logging system, and
adjust the audio-visual content program based on the at least one property of the audience.

* * * * *

UNITED STATES PATENT AND TRADEMARK OFFICE
CERTIFICATE OF CORRECTION

PATENT NO. : 11,317,145 B2
APPLICATION NO. : 16/625187
DATED : April 26, 2022
INVENTOR(S) : Christopher Krauß et al.

It is certified that error appears in the above-identified patent and that said Letters Patent is hereby corrected as shown below:

In the Claims

Column 32, Line 46 (Claim 18):
-identifiers-
Should be changed to:
--identifier--.

Signed and Sealed this
Eighteenth Day of October, 2022

Katherine Kelly Vidal
*Director of the United States Patent and Trademark Office*